United States Patent
Wang et al.

(10) Patent No.: US 12,545,985 B2
(45) Date of Patent: *Feb. 10, 2026

(54) HIGH-FORMABILITY HOT GALVANIZED ALUMINUM-ZINC OR HOT GALVANIZED ALUMINUM-MAGNESIUM DUAL-PHASE STEEL AND RAPID HEAT TREATMENT HOT DIPPING FABRICATION METHOD THEREFOR

(71) Applicant: BAOSHAN IRON & STEEL CO., LTD., Shanghai (CN)

(72) Inventors: Jian Wang, Shanghai (CN); Jun Li, Shanghai (CN); Liyang Zhang, Shanghai (CN); Xiaofeng Du, Shanghai (CN); Zhilong Ding, Shanghai (CN); Huafei Liu, Shanghai (CN); Yuling Ren, Shanghai (CN); Yao Du, Shanghai (CN); Chuanhua Lin, Shanghai (CN); Yi Yang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 140 days.

This patent is subject to a terminal disclaimer.

(21) Appl. No.: 18/552,934

(22) PCT Filed: Mar. 31, 2022

(86) PCT No.: PCT/CN2022/084543
§ 371 (c)(1),
(2) Date: Sep. 28, 2023

(87) PCT Pub. No.: WO2022/206917
PCT Pub. Date: Oct. 6, 2022

(65) Prior Publication Data
US 2024/0167140 A1    May 23, 2024

(30) Foreign Application Priority Data

Apr. 2, 2021    (CN) .......................... 202110360129.3
Apr. 2, 2021    (CN) .......................... 202110360134.4

(51) Int. Cl.
*C23C 2/12*         (2006.01)
*C21D 8/02*        (2006.01)
(Continued)

(52) U.S. Cl.
CPC .............. *C23C 2/12* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS

2005/0167007 A1    8/2005   Miura et al.
2015/0034215 A1    2/2015   Schulz et al.
(Continued)

FOREIGN PATENT DOCUMENTS

CN           1789467 A   *   6/2006
CN      101899619 A   *   12/2010       ............. C21D 6/002
(Continued)

OTHER PUBLICATIONS

International Search Report for PCT/CN2022/084543 dated Jun. 28, 2022.
(Continued)

*Primary Examiner* — Xiaobei Wang
(74) *Attorney, Agent, or Firm* — Lei Fang, Esq.; Smith Tempel Blaha LLC

(57) ABSTRACT

A high-formability hot galvanized aluminum-zinc or hot galvanized aluminum-magnesium dual-phase steel having a
(Continued)

tensile strength of ≥590 MPa and a rapid heat treatment hot dipping fabrication method, the steel comprising the following components in mass percentage: C: 0.045-0.12%; Si: 0.1-0.5%; Mn: 1.0-2.0%; P: ≤0.02%; S: ≤0.006%; and Al: 0.02-0.055%. The steel may also contain one or two among Cr, Mo, Ti, Nb, and V, wherein the Cr+Mo+Ti+Nb+V≤0.5%, and the remainder is Fe and other inevitable impurities. The present invention changes the recovery of a deformed structure, ferrite recrystallization and austenite transformation processes during annealing by means of rapid heat treatment, and the nucleation point of a crystal is increased, grain growth time is shortened, the strength and formability (n90 value) of the material is improved while heat treatment efficiency is improved, which thus extends the performance range of the material.

17 Claims, 3 Drawing Sheets

(51) Int. Cl.
  *C22C 38/00*  (2006.01)
  *C22C 38/02*  (2006.01)
  *C22C 38/04*  (2006.01)
  *C22C 38/06*  (2006.01)
  *C23C 2/06*  (2006.01)
  *C23C 2/40*  (2006.01)
(52) U.S. Cl.
  CPC .......... *C21D 8/0263* (2013.01); *C22C 38/002* (2013.01); *C22C 38/02* (2013.01); *C22C 38/04* (2013.01); *C22C 38/06* (2013.01); *C23C 2/06* (2013.01); *C23C 2/40* (2013.01); *C21D 2211/005* (2013.01); *C21D 2211/008* (2013.01)

(56) References Cited

U.S. PATENT DOCUMENTS

| | | | | |
|---|---|---|---|---|
| 2019/0078173 | A1* | 3/2019 | Takashima | C22C 38/50 |
| 2022/0074015 | A1* | 3/2022 | Kubo | C21D 9/46 |
| 2023/0010877 | A1* | 1/2023 | Rana | C21D 8/0426 |
| 2023/0141963 | A1* | 5/2023 | Tanaka | C22C 38/48 |
| | | | | 420/87 |

FOREIGN PATENT DOCUMENTS

| | | | | | |
|---|---|---|---|---|---|
| CN | 102586688 | A | | 7/2012 | |
| CN | 102758136 | A | | 10/2012 | |
| CN | 103938097 | A | | 7/2014 | |
| CN | 104109814 | A | | 10/2014 | |
| CN | 106086638 | A | | 11/2016 | |
| CN | 109825768 | A | | 5/2019 | |
| CN | 110331341 | A | | 10/2019 | |
| CN | 110527923 | A | | 12/2019 | |
| CN | 110863137 | A | * | 3/2020 | ............... C21D 1/26 |
| CN | 111172474 | A | | 5/2020 | |
| CN | 111910123 | A | * | 11/2020 | ............. C22C 38/06 |
| EP | 2290111 | A1 | | 3/2011 | |
| JP | 11350038 | A | | 12/1999 | |
| JP | 2002235145 | A | | 8/2002 | |
| JP | 2004018911 | A | | 1/2004 | |
| JP | 2010126747 | A | | 6/2010 | |
| WO | 2017/169940 | A | | 4/2018 | |
| WO | 2020/145259 | A | | 2/2021 | |

OTHER PUBLICATIONS

International Written Opinion for PCT/CN2022/084543 dated Jun. 28, 2022.
The extended European search report dated Sep. 5, 2024 for EP App No. 22779097.9.
JP OA dated Nov. 12, 2024 for JP App No. 2023-560592.

* cited by examiner

HIGH-FORMABILITY HOT GALVANIZED ALUMINUM-ZINC OR HOT GALVANIZED ALUMINUM-MAGNESIUM DUAL-PHASE STEEL AND RAPID HEAT TREATMENT HOT DIPPING FABRICATION METHOD THEREFOR

CROSS-REFERENCE TO RELATED APPLICATIONS

This application is a 371 U.S. National Phase of PCT International Application No. PCT/CN2022/084543 filed on Mar. 31, 2022, which claims benefit and priority to Chinese patent application Nos. CN202110360129.3 and CN202110360134.4, respectively, each of which was filed on Apr. 2, 2021, the contents of each of the above listed applications are incorporated by reference herein in their entireties.

TECHNICAL FIELD

The present disclosure relates to the field of rapid heat treatment of materials, and in particular relates to hot-dip aluminum-zinc or hot-dip zinc-aluminum-magnesium dual-phase steel with high formability (including hot-dip aluminum-zinc AZ product or hot-dip zinc-aluminum-magnesium AM product) and a manufacturing method for the same by rapid heat treatment.

BACKGROUND ART

With the gradual improvement of people's awareness of energy conservation and material service safety, many car manufacturers choose high-strength steel as automotive materials. The exhaust system of automobiles requires materials with high strength, high toughness, high corrosion resistance, and also certain heat resistance. At the same time, home appliances and building materials not only require substrate materials with high strength and thinning, but also require the coating layer with good corrosion resistance. It can be seen that the corrosion resistance, dent resistance, durability strength, large deformation impact strength and safety requirements of coated products in automobiles, home appliances, construction and other fields are getting higher and higher.

Among the hot galvanized high-strength steels used in automobiles, hot galvanized dual-phase steels are the most widely used and have the best application prospects. Low-carbon low-alloy hot galvanized dual phase steel has the characteristics of small yield ratio, high initial work hardening rate and good matching of strength and plasticity, and has become widely used steel for stamping automotive structures with high strength and good formability.

However, with the continuous increasing requirement for corrosion resistance of steel products, hot-dip zinc has gradually failed to meet the requirements, and it is urgent to develop new varieties of high corrosion-resistant coatings. Therefore, the studies of hot-dip aluminum-zinc and hot-dip zinc-aluminum-magnesium coatings with better corrosion resistance are increasing. Correspondingly, hot-dip aluminum-zinc, hot-dip zinc-aluminum-magnesium high-strength steel products also emerge.

At present, the main means for the development of hot-dip aluminum-zinc and hot-dip zinc-aluminum-magnesium-coated dual phase steel is to change the microstructure properties of hot-galvanized dual phase steel by adding alloying elements and adjusting the soaking temperature, time and cooling rate in the critical annealing process.

Chinese patent application CN201710994660.X discloses "A 550 MPa grade hot-dip aluminum-zinc structural steel plate and a preparation method thereof". It comprises the following chemical components: C: 0.02-0.07%, Si≤0.03%, Mn: 0.15-0.30%, P≤0.020%, Si≤0.020%, Nb: 0.015-0.030%, Als: 0.020-0.070%. It is cold rolled at a low cold rolling reduction rate of 55-60%. The yield strength is 550 MPa or more, the tensile strength is 560 MPa, and the elongation is about 10%. The steel plate proposed by this patent has a low elongation, and it has a problem of relatively high yield ratio, which will have an impact on the subsequent processing process.

Chinese patent application CN102363857B discloses "A manufacturing method of structural color coated plate having a yield strength of 550 MPa". The plate comprises at most 0.05% of Ti and 0.045% of Nb, respectively, and has a yield strength $R_{p0.2}$ up to 550-600 MPa, a tensile strength $R_m$ of 560-610 MPa, and an elongation after break $A_{80}$ mm of ≥6%. The strengthening method is mainly performed by low-temperature annealing to maintain most of un-crystallized banded structure to improve strength. But it has relatively poor plasticity, which also has an impact on formability.

Chinese patent application CN100529141C discloses "A full hard aluminum-zinc plated steel plate and a manufacturing method thereof". The steel plate prepared by this method has a yield strength of up to 600 MPa or more, an elongation at break of ≤7%, and a total content of Ti and Nb of 0.15%-0.100%. The annealing temperature is controlled at 630-710° C. The full hard steel plate is obtained by low-temperature recovery annealing. The elongation of the steel plate obtained by this method is too low to meet the current processing requirements for forming performance.

Chinese patent application CN201911161556.8 discloses "A hot-dip zinc-aluminum-magnesium high-strength steel, a manufacturing method and use thereof". The hot-dip zinc-aluminum-magnesium high-strength steel includes the substrate and the zinc-aluminum-magnesium alloy coating on the surface of the substrate. By the composition design and the production process control on the basis of the composition design, a production program and key technology of smelting, hot rolling, cold rolling, annealing process and core production technology with CSP thin slab continuous casting and continuous rolling production line and ordinary hot-galvanizing production line as the core process is formed. The above hot-dip zinc-aluminum-magnesium high-strength steel has a yield strength of greater than 550 MPa and an elongation of >17%. Due to poor formability, it is only suitable for photovoltaic brackets, highway guardrails and other industries that require high corrosion resistance but do not have high formability requirements.

Chinese patent application CN106811686A discloses "A high strength zinc aluminum magnesium coated steel plate with good surface quality and a manufacturing method thereof". The chemical composition of the steel plate includes C: 0.09-0.18%, Si: 0.40-1.60%, Mn: 0.80-2.10%, S: 0.001-0.008%, and optional Cr: 0.01-0.60%, and/or Mo: 0.01-0.30%. The coating comprises the following chemical composition: Al: 1-14%, Mg: 1.0-5.0%, with a balance of zinc and unavoidable impurities. Although the patent proposes a manufacturing method of high-strength zinc-aluminum-magnesium-coated steel plate, its cost is high. Too high Si content tends to cause surface quality problems, too high yield strength and low elongation, which affect subsequent processing and forming.

Chinese patent application CN104419867A discloses "A 1250 MPa grade ultra-high strength zinc aluminum magnesium coated steel plate and a manufacturing method thereof". The steel plate comprises a chemical composition in weight percentage as follows: C: 0.15~0.35%, Si: 0.50~1.80%, Mn: 2.0~5.0%, Mn/Si of not less than 2, with a balance of iron and unavoidable impurities. The coating has a chemical composition in weight percentage as follows: Al: 1~15%, Mg: 1~5%, Al/Mg≥1, with a balance of Zn and unavoidable impurities. The manufacturing method includes smelting—continuous casting—hot continuous rolling—cold continuous rolling—continuous hot dip galvanizing process. High corrosion resistance ultra-high strength zinc aluminum magnesium coated steel plate manufactured according to the invention has a strength of 1250~1500 MPa and an elongation after break of 12~18%. The corrosion resistance is more than 4 times that of common galvanized plate. The coating has no cracks at 180° 5a bending, no peeling and meets the needs of high corrosion resistance, high strength and reduction. Although the patent proposes a manufacturing method of high-strength zinc-aluminum-magnesium-coated steel plate, too high Si content tends to cause surface quality problems. Too high C content results in poor weldability and affects subsequent processing and forming.

In summary, at present, hot-dip aluminum-zinc and hot-dip zinc-aluminum-magnesium products have high cost, poor surface quality, and poor matching of strength or elongation, resulting in problems in subsequent processing and molding. At the same time, in the past, limited by the production equipment of enterprises, most of the relevant research was based on that the strip steel is heated at a heating rate of existing heating equipment (5~20° C./s) to complete recrystallization and austenitization (Chinese patent CN104988391A). In recent years, the development of rapid heating technologies such as transverse magnetic induction heating and new direct fire heating has enabled the industrial application of rapid heat treatment processes. The austenitization of cold-rolled strip steel from room temperature to the final completion can be expected to be completed in more than ten seconds or even a few seconds, which greatly shortens the length of the heating section of the furnace and improve the speed and production efficiency of the unit. At the same time, the recrystallization and austenitization completed in a very short time will also provide a more flexible microstructure design, so as to improve the material properties without changing the alloy composition and rolling process.

High resistance advanced high-strength steel represented by dual-phase steel has broad application prospects. The rapid heat treatment technology has great development value. Their combination will surely provide more space for the development of dual-phase steel.

SUMMARY

One object of the present disclosure is to provide a hot-dip aluminum-zinc hot-dip aluminum-zinc or hot-dip zinc-aluminum-magnesium dual-phase steel with high formability having a tensile strength of ≥590 MPa (including hot-dip aluminum-zinc AZ or hot-dip zinc-aluminum-magnesium AM product) and a hot dipping manufacturing method for the same by rapid heat treatment. The recovery of deformed matrix, ferrite recrystallization, austenite phase transition and grain growth during the annealing process are controlled by rapid heating, and fine ferrite structure and multi-morphological strengthened phase structure are obtained after the completion of final heat treatment. The strength of the material is greatly improved while the toughness is also improved. The resultant dual-phase steel has a yield strength of ≥300 MPa, a tensile strength of ≥590 MPa, an elongation of ≥20%, a product of strength and elongation of ≥15 GPa % and and a strain hardening index $n_{90}$ value greater than 0.20.

To achieve the above object, the technical solution of the present disclosure is as follows:

The hot-dip aluminum-zinc or hot-dip zinc-aluminum-magnesium dual-phase steel with high formability having a tensile strength of ≥590 MPa comprises the following chemical components in mass percentages: C: 0.045~0.12%, Si: 0.1~0.5%, Mn: 1.0~2.0%, P≤0.02%, S≤0.006%, Al: 0.02~0.055%, optionally one or two of Cr, Mo, Ti, Nb, V, and Cr+Mo+Ti+Nb+V≤0.5%, with a balance of Fe and other unavoidable impurities. Preferably, the hot-dip aluminum-zinc or hot-dip zinc-aluminum-magnesium dual-phase steel with high formability has a yield strength of ≥300 MPa, a tensile strength of ≥590 MPa, an elongation of ≥20%, a product of strength and elongation of ≥15 GPa % and and a strain hardening index $n_{90}$ value greater than 0.20; more preferably, it has a yield strength of 300~560 MPa, such as 300~400 MPa or 450~560 MPa, a tensile strength of 590~860 MPa, preferably 630~860 MPa, an elongation of 20~30%, a product of strength and elongation of 15~21 GPa %. Preferably, the C content is 0.045~0.105% or 0.05~0.12%. Preferably, the Si content is 0.1~0.4%. Preferably, the Mn content is 1.0%~1.5% or 1.2~2.0%. Preferably, the dual phase steel may comprise one or two of Cr, Mo, Ti, Nb, V, and Cr+Mo+Ti+Nb+V≤0.3%. Preferably, the metallographic structure of dual-phase steel is uniformly distributed ferritic and martensitic dual-phase structure having an average grain size of 1~5 μm.

Preferably, the hot-dip aluminum-zinc or hot-dip zinc-aluminum-magnesium dual-phase steel with high formability having a tensile strength of ≥590 MPa is obtained by the following process:

1) Smelting, casting
   wherein the above components are subjected to smelting and casting to form a slab;
2) Hot rolling, coiling
   wherein a coiling temperature is 550~680° C.;
3) Cold rolling
   wherein a cold rolling reduction rate is 40~85%;
4) Rapid heat treatment, hot-dipping aluminum-zinc or hot-dipping zinc-aluminum-magnesium
   wherein the steel plate after cold rolling is rapidly heated to 750~845° C., wherein the rapid heating is performed in one stage or two stages;
   when the rapid heating is performed in one stage, a heating rate is 15~500° C./s, such as 50~500° C./s;
   when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);
   then soaked at a soaking temperature of 750~845° C. for a soaking time of 10~60 s;
   wherein after soaking, the steel plate is slowly cooled to 670~770° C. at a cooling rate of 5~15° C./s, then rapidly cooled to 580~600° C. at a cooling rate of 50~200° C./s (such as 50~150° C./s), and immersed in a zinc pot for hot-dipping aluminum-zinc or hot-dipping zinc-aluminum-magnesium;

after hot-dipping aluminum-zinc, the steel plate is rapidly cooled to room temperature at a cooling rate of 30~200° C./s (30~150° C./s) to obtain a hot-dip aluminum-zinc AZ product; or after hot-dipping zinc-aluminum-magnesium, the steel plate is rapidly cooled to room temperature at a cooling rate of 10~300° C./s (30~180° C./s) to obtain a hot-dip zinc-aluminum-magnesium AM product.

Preferably, the C content is 0.065~0.085% or 0.07~0.10%.

Preferably, the Si content is 0.15~0.25% or 0.1~0.4%.

Preferably, the Mn content is 1.2%~1.35% or 1.5~1.8%.

Preferably, the dual phase steel may comprise one or two of Cr, Mo, Ti, Nb, V, and Cr+Mo+Ti+Nb+V≤0.4%, or ≤0.2%.

Preferably, a total time of the rapid heat treatment and hot-dipping aluminum-zinc or hot-dipping zinc-aluminum-magnesium of step 4) is 29~159 s, preferably 29~122 s.

Preferably, in step 2), a hot rolling finishing temperature is ≥$A_{r3}$.

Preferably, in step 2), the coiling temperature is 580~650° C.

Preferably, in step 3), the cold rolling reduction rate is 60~80%.

Preferably, in step 4), when the rapid heating is performed in one stage, the heating rate is 50~300° C./s.

Preferably, in step 4), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s.

Preferably, in step 4), the rapid heating is performed in two stages, wherein the steel plate is heated in the first stage from room temperature to 550~650° C. at a heating rate of 30~300° C./s, heated in the second stage from 550~650° C. to 750~845° C. at a heating rate of 80~300° C./s.

Preferably, in step 4), after hot-dipping zinc-aluminum-magnesium, the steel plate is rapidly cooled to room temperature at a cooling rate of 30~250° C./s to obtain a hot-dip zinc-aluminum-magnesium AM product.

Preferably, the metallographic structure of dual-phase steel is uniformly distributed ferritic and martensitic dual-phase structure having an average grain size of 1~5 μm, such as 1~3 μm.

In some embodiments, the hot-dip aluminum-zinc or hot-dip zinc-aluminum-magnesium dual-phase steel with high formability having a tensile strength of ≥590 MPa according to the present disclosure comprises the following chemical components in mass percentages: C: 0.045~0.105%, Si: 0.1~0.4%, Mn: 1.0~1.5%, P0.02%, S≤0.006%, Al: 0.02~0.055%, optionally one or two of Cr, Mo, Ti, Nb, V, and Cr+Mo+Ti+Nb+V≤0.3%, with a balance of Fe and other unavoidable impurities. Preferably, the C content in the dual phase steel is 0.065~0.085%. Preferably, the Si content in the dual phase steel is 0.15~0.25%. Preferably, the Mn content in the dual phase steel is 1.2~1.35%. Preferably, the dual phase steel may comprise one or two of Cr, Mo, Ti, Nb, V, and Cr+Mo+Ti+Nb+V≤0.2%. Preferably, the metallographic structure of dual-phase steel is uniformly distributed ferritic and martensitic dual-phase structure having an average grain size of 1~3 μm. Preferably, the dual-phase steel has a yield strength of ≥30~400 MPa, a tensile strength of 630~700 MPa, an elongation of 22~30%, a product of strength and elongation of 15~20 GPa % and a strain hardening index $n_{90}$ value greater than 0.21; more preferably, the dual phase steel has a yield strength of 304~398 MPa, a tensile strength of 630~698 MPa, an elongation of 22.3~29.4%, a product of strength and elongation of 15.3~19.4 GPa % and a strain hardening index $n_{90}$ value greater than 0.21. Preferably, the dual phase steel is obtained by the following process:

a) Smelting, casting wherein the above components are subjected to smelting and casting to form a slab;

b) Hot rolling, coiling wherein a coiling temperature is 550~680° C.;

c) Cold rolling wherein a cold rolling reduction rate is 40~85%;

d) Rapid heat treatment, hot-dipping aluminum-zinc or hot-dipping zinc-aluminum-magnesium wherein the steel plate after cold rolling is rapidly heated to 750~845° C., wherein the rapid heating is performed in one stage or two stages;

when the rapid heating is performed in one stage, a heating rate is 15~500° C./s, such as 50~500° C./s;

when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);

then soaked at a soaking temperature of 750~845° C. for a soaking time of 10~60 s;

wherein after soaking, the steel plate is slowly cooled to 670~770° C. at a cooling rate of 5~15° C./s, then rapidly cooled to 580~600° C. at a cooling rate of 50~200° C./s (such as 50~150° C./s), and immersed in a zinc pot for hot-dipping aluminum-zinc or hot-dipping zinc-aluminum-magnesium;

after hot-dipping aluminum-zinc, the steel plate is rapidly cooled to room temperature at a cooling rate of 30~200° C./s to obtain a hot-dip aluminum-zinc AZ product; or after hot-dipping zinc-aluminum-magnesium, the steel plate is rapidly cooled to room temperature at a cooling rate of 30~180° C./s to obtain a hot-dip zinc-aluminum-magnesium AM product.

Preferably, a total time of the rapid heat treatment and hot-dipping aluminum-zinc or hot-dipping zinc-aluminum-magnesium of step d) is 29~122 s.

Preferably, in step b), a hot rolling finishing temperature is ≥$A_{r3}$.

Preferably, in step b), the coiling temperature is 580~650° C.

Preferably, in step c), the cold rolling reduction rate is 60~80%.

Preferably, in step d), when the rapid heating is performed in one stage, the heating rate is 50~300° C./s.

Preferably, in step d), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s.

Preferably, in step d), the rapid heating is performed in two stages, wherein the steel plate is heated in the first stage from room temperature to 550~650° C. at a heating rate of 30~300° C./s, heated in the second stage from 550~650° C. to 750~845° C. at a heating rate of 80~300° C./s.

In some embodiments, the hot-dip aluminum-zinc or hot-dip zinc-aluminum-magnesium dual-phase steel with high formability having a tensile strength of ≥590 MPa according to the present disclosure comprises the following chemical components in mass percentages: C: 0.05~0.12%, Si: 0.1~0.5%, Mn: 1.2~2.0%, P≤0.015%, S≤0.003%, Al:

0.02~0.055%, optionally one or two of Cr, Mo, Ti, Nb, V, and Cr+Mo+Ti+Nb+V≤0.5%, with a balance of Fe and other unavoidable impurities. Preferably, the C content in the dual phase steel is 0.07~0.10%. Preferably, the Si content in the dual phase steel is 0.1~0.4%. Preferably, the Mn content in the dual phase steel is 1.5~1.8%. Preferably, the dual phase steel may comprise one or two of Cr, Mo, Ti, Nb, V, and Cr+Mo+Ti+Nb+V≤0.4%. Preferably, the metallographic structure of dual-phase steel is uniformly distributed ferritic and martensitic dual-phase structure having an average grain size of 1~5 μm. Preferably, the dual-phase steel has a yield strength of ≥470~560 MPa, a tensile strength of 780~860 MPa, an elongation of 20~25%, a product of strength and elongation of 16~21 GPa % and a strain hardening index $n_{90}$ value greater than 0.20; more preferably, the dual phase steel has a yield strength of 476~556 MPa, a tensile strength of 786~852 MPa, an elongation of 20.1~24.8%, a product of strength and elongation of 16.7~20.2 GPa % and a strain hardening index $n_{90}$ value greater than 0.20. Preferably, the dual phase steel is obtained by the following process:

A) Smelting, casting
wherein the above components are subjected to smelting and casting to form a slab;
B) Hot rolling, coiling
wherein a coiling temperature is 550~680° C.;
C) Cold rolling
wherein a cold rolling reduction rate is 40~85%;
D) Rapid heat treatment, hot-dipping aluminum-zinc or hot-dipping zinc-aluminum-magnesium
wherein the steel plate after cold rolling is rapidly heated to 750~845° C., wherein the rapid heating is performed in one stage or two stages;
when the rapid heating is performed in one stage, a heating rate is 15~500° C./s, such as 50~500° C./s;
when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);
then soaked at a soaking temperature of 750~845° C. for a soaking time of 10~60 s;
wherein after soaking, the steel plate is slowly cooled to 670~770° C. at a cooling rate of 5~15° C./s, then rapidly cooled to 580~600° C. at a cooling rate of 50~200° C./s (such as 50~150° C./s), and immersed in a zinc pot for hot-dipping aluminum-zinc or hot-dipping zinc-aluminum-magnesium;
after hot-dipping aluminum-zinc, the steel plate is rapidly cooled to room temperature at a cooling rate of 30~150° C./s to obtain a hot-dip aluminum-zinc AZ product; or
after hot-dipping zinc-aluminum-magnesium, the steel plate is rapidly cooled to room temperature at a cooling rate of 10~300° C./s to obtain a hot-dip zinc-aluminum-magnesium AM product.

Preferably, a total time of the rapid heat treatment and hot-dipping aluminum-zinc or hot-dipping zinc-aluminum-magnesium of step D) is 29~159 s.

Preferably, in step B), a hot rolling finishing temperature is ≥$A_{r3}$.

Preferably, in step B), the coiling temperature is 580~650° C.

Preferably, in step C), the cold rolling reduction rate is 60~80%.

Preferably, in step D), when the rapid heating is performed in one stage, the heating rate is 50~300° C./s.

Preferably, in step D), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s.

Preferably, in step D), the rapid heating is performed in two stages, wherein the steel plate is heated in the first stage from room temperature to 550~650° C. at a heating rate of 30~300° C./s, heated in the second stage from 550~650° C. to 750~845° C. at a heating rate of 80~300° C./s.

Preferably, in step D), after hot-dipping zinc-aluminum-magnesium, the steel plate is rapidly cooled to room temperature at a cooling rate of 30~250° C./s to obtain a hot-dip zinc-aluminum-magnesium AM product.

In the composition and process design of the steel according to the present disclosure:

C: Carbon is the most common strengthening element in steel. Carbon increases the strength of steel and decreases its plasticity. However, forming steels require low yield strength, high uniform elongation and high total elongation. The carbon content has a great influence on the mechanical properties of steel. With the increase of carbon content, the number of pearlite will increase, so that the strength and hardness of steel will be greatly improved, but its plasticity and toughness will be significantly reduced. If the carbon content is too high, obvious network carbides will appear in steel, and the presence of network carbides will significantly reduce its strength, plasticity and toughness. The strengthening effect produced by the increase of carbon content in steel will also be significantly weakened, and the process performance of steel will be deteriorated. Therefore, the carbon content should be reduced as much as possible on the premise of ensuring strength.

For dual-phase steels, carbon mainly affects the volume fraction of austenite formed during annealing. The diffusion process of carbon in austenite or ferrite actually plays a role in controlling the growth of austenite grains during the formation of austenite. With the increase of carbon content or the heating temperature in the critical zone, the volume fraction of austenite increases, thus the martensitic phase structure formed after cooling increases and the strength of the material increases. Comprehensively considering the matching of material strength and toughness, the increase of the strength during the rapid annealing process, the carbon content of the present disclosure is controlled in the range of 0.045~0.12%.

Mn: Manganese can form a solid solution with iron, thereby improving the strength and hardness of ferrite and austenite in carbon steel, and providing finer pearlite with higher strength in the steel during the cooling process after hot rolling, and the content of pearlite will also increase with the increase of Mn content. Manganese is also a carbide-forming element, and the carbide of manganese can dissolve into the cementite, thereby indirectly enhancing the strength of pearlite. Manganese can also strongly enhance the hardenability of steel, thereby further improving its strength.

For dual-phase steels, manganese is one of the elements that obviously affects the dynamics of austenite formation during annealing in the critical zone. Manganese mainly affects the transition and growth to ferrite after formation of austenite and the final equilibrium process of austenite and ferrite. Since the diffusion rate of manganese in austenite is much slower than its diffusion rate in ferrite, austenite grains controlled by manganese diffusion takes long time to grow and manganese element takes longer time to achieve uniform distribution in austenite. When heated in the critical zone, if the holding time is short, the manganese element cannot achieve uniform distribution in austenite, and then when the cooling rate is insufficient, a uniform martensitic island structure cannot be obtained. In dual-phase steel produced by rapid heating process (such as continuous annealing production line with water quenching), the manganese content is generally high. As a result, austenite has a high manganese content after formation, which ensures the hardenability of the austenitic island, and that a uniform martensitic island structure and relatively uniform performance is obtained after cooling. In addition, manganese expands the y phase region and reduces the temperature of $A_{c1}$ and $A_{c3}$, so that manganese-containing steel will get a higher martensitic volume fraction than low carbon steel under the same heat treatment conditions. However, when the manganese content is relatively high, there is a tendency to coarsen the grains in the steel and the overheating sensitivity of the steel is increased, and when the cooling is improper after smelting pouring and forging, it is easy to produce white spots in the carbon steel. Considering the above factors, the manganese content is designed in the range of 1.0~2.0% in the present disclosure.

Si: Silicon forms a solid solution in ferrite or austenite, thereby enhancing the yield strength and tensile strength of steel. Silicon can increase the cold working deformation hardening rate of steel and is a beneficial element in alloy steel. In addition, silicon has obvious enrichment phenomenon on the surface of silicon-manganese steel along the crystal fracture, and the segregation of silicon at the grain boundary can alleviate the distribution of carbon and phosphorus along the grain boundary, thereby improving the embrittlement state of the grain boundary. Silicon can improve the strength, hardness and wear resistance of steel and will not significantly reduce the plasticity of steel. Silicon has a strong deoxidation capacity and is a commonly used deoxidation agent in steelmaking. Silicon can also increase the fluidity of molten steel, so generally the steel contains silicon. But when the content of silicon in steel is too high, its plasticity and toughness will be significantly reduced.

For dual-phase steels, the main effect of silicon is to reduce the austenite volume fraction at final equilibrium under the given annealing time condition. Silicon has no obvious effect on the growing rate of austenite, but has a significant effect on the morphology and distribution of austenite. Therefore, the silicon content is determined in the range of 0.1~0.5% in the present disclosure.

Cr: The main function of chromium in steel is to improve the hardenability, so that the steel has good comprehensive mechanical properties after quenching and tempering. Chromium and iron form a continuous solid solution and the austenitic phase area is reduced. Chromium and carbon form a variety of carbides and its affinity with carbon is greater than that of iron and manganese. Chromium and iron can form an intermetallic σ phase (FeCr), and chromium reduces the concentration of carbon in pearlite and the solubility limit of carbon in austenite. Chromium slows down the decomposition rate of austenite and significantly improves the hardenability of steel. However, it also has a tendency of increasing temper brittleness of steel. Chromium can improve the strength and hardness of steel, when other alloying elements are added, the effect is more significant. Since Cr improves the quenching ability of steel during air cooling, it has an adverse effect on the welding performance of steel. However, when the chromium content is less than 0.3%, the adverse effect on weldability can be ignored. When it is greater than 0.3%, it is easy to produce defects such as cracks and slag inclusions during welding. When Cr and other alloying elements exist at the same time (such as coexisting with V), the adverse effect of Cr on weldability is greatly reduced. For example, when Cr, Mo, V and other elements exist in steel at the same time, even if the Cr content reaches 1.7%, there is no significant adverse effect on the welding performance of steel. In the present disclosure, the Cr element is a beneficial and inessential element. Considering the cost and other factors, the added amount of Cr should not be too much. In some embodiments, the Cr content is ≤0.35%.

Mo: Molybdenum inhibits the self-diffusion of iron and the diffusion rate of other elements. The radius of Mo atom is larger than that of α-Fe atom. When Mo is dissolved in a solid solution, the solid solution has strong lattice distortion. Meanwhile, Mo can increase the lattice atomic bond attraction and increase the recrystallization temperature of a ferrite. Mo has a significant strengthening effect in pearlitic, ferritic, martensitic steel, and even in high-alloy austenitic steel. The beneficial role of Mo in steel also depends on the interaction with other alloying elements in steel. When strong carbide-forming elements V, Nb and Ti are added to the steel, the solid-solution strengthening effect of Mo is more significant. This is because when the strong carbide-forming element combines with C to form a stable carbide, it can promote Mo to dissolve into the solid solution more efficiently, which is more conducive to the improvement of the hot strength of steel. The addition of Mo can also increase the hardenability of steel, but the effect was not as significant as C and Cr. Mo can inhibit the transition of pearlite region and accelerate the transition in the medium temperature zone, so that a certain amount of bainite can be formed in Mo-containing steel in the case of a large cooling rate and the formation of ferrite is eliminated. That is one of the reasons why Mo has a favorable effect on the hot strength of low alloy heat-resistant steel. Mo can also significantly reduce the hot embrittlement tendency of steel and reduce the spheroidization rate of pearlite. When the Mo content is no more than 0.15%, there is no adverse effect on the welding performance of steel. In the present disclosure, the Mo element is a beneficial and inessential element. Considering the cost and other factors, the added amount of Mo should not be too much. In some embodiments, the Mo content is ≤0.2%.

Microalloying elements Ti, Nb, V: Adding a trace amount of microalloying elements Nb, V, Ti to steel can ensure that the steel has good weldability and usability by dispersing and precipitating their carbide and nitride particles (particle size less than 5 nm) and solid solution of Nb, V, Ti to refine grains, greatly improve the strength and toughness (especially low temperature toughness) of steel under the condition of low carbon equivalent. Nb, V, Ti are forming elements of carbide and nitride and can meet the requirement at relatively low concentrations. Nb, V, Ti are strong carbide-forming elements. At room temperature, most of these elements in the steel exists in the form of carbide, nitride and carbonitride, and a small part is dissolved in ferrite. The addition of Nb, V, Ti can prevent the growth of austenite grains and increase the coarsening temperature of steel. This is because their carbide and nitride are dispersed small particles and play a fixation role on austenite grain boundaries, hinder the migration of austenite grain boundaries, increase austenite recrystallization temperature and expand the uncrystallized region, i.e., preventing the growth of austenite grains. Adding trace amounts of Nb, V, Ti to steel, on one hand, can improve the welding performance of steel while reducing the carbon equivalent content and improving the strength. On the other hand, impure substances such as oxygen, nitrogen, sulfur, etc. are fixed, so as to improve the weldability of steel. Due to the action of its microparticles, such as the insolubility of TiN at high temperature, it can prevent the coarsening of grains in the heat-affected zone, improve the toughness of the heat-affected zone, and thus improve the welding performance of steel. In the present disclosure, the microalloying elements are beneficial and inessential elements. Considering the cost and other factors, the added amount should not be too much. In some embodiments, the Ti content is ≤0.04%. In some embodiments, the Nb content is ≤0.05%. In some embodiments, the V content is ≤0.05%.

In the present disclosure, the recovery of deformed structure, recrystallization, austenite phase transition and grain growth in continuous heat treatment process are controlled by rapid heat treatment process including rapid heating, short-term heat preservation and rapid cooling process. During the cooling process, not only the ferrite matrix phase is formed, but also various strengthened phases and ingredient gradient distributions within the phase are generated. Finally, fine ferrite structure and reinforced phase structure with multi-morphology are obtained, so that the material can have better matching of strength and toughness, reducing the alloy cost and manufacturing difficulty of each process, and improving the use performance such as the welding performance of the same strength steel grade.

The specific principle is that different heating rates are used at different temperature stages of the heating process. The recovery of deformed structure mainly occurs in the low temperature section, and a relatively low heating rate can be used to reduce energy consumption. The recrystallization and grain growth of different phase structures mainly occur in the high temperature section and it is necessary to use relatively high heating rate to shorten the residence time of the structure in the high temperature zone to ensure no growth of grains. By controlling the heating rate in the heating process, the recovery of deformed structure and the ferrite recrystallization process during heating are suppressed, so that the recrystallization process overlaps with the austenite phase transition process. The nucleation points of recrystallized grains and austenite grains are increased and finally the grains are refined. By short-term heat preservation and rapid cooling, the grain growth time in the soaking process is shortened to ensure that the grain structure is small and evenly distributed.

The manufacturing process of the hot-dip aluminum-zinc or hot-dip zinc-aluminum-magnesium dual-phase steel with high formability having a tensile strength of ≥590 MPa according to the present disclosure comprises the following steps:

1) Smelting, casting
   wherein the above components are subjected to smelting and casting to form a slab;
2) Hot rolling, coiling
   wherein a coiling temperature is 550~680° C.;
3) Cold rolling
   wherein a cold rolling reduction rate is 40~85%, thereby obtaining a rolled hard strip steel or steel plate;
4) Rapid heat treatment, hot-dipping aluminum-zinc or hot-dipping zinc-aluminum-magnesium
   A) Rapid heating
   wherein the strip steel or steel plate after cold rolling is rapidly heated from room temperature to 750~845° C., which is the target temperature of the dual phase region of austenite and ferrite;
   wherein the rapid heating is performed in one stage or two stages;
   when the rapid heating is performed in one stage, a heating rate is 15~500° C./s, such as 50~500° C./s;
   when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);
   B) soaking
   wherein the strip steel or steel plate is soaked at a soaking temperature of 750~845° C., which is the target temperature of the dual phase region of austenite and ferrite, for a soaking time of 10~60 s;
   C) Cooling
   wherein after soaking, the strip steel or steel plate is slowly cooled to 670~770° C. at a cooling rate of 5~15° C./s, then rapidly cooled to 580~600° C. at a cooling rate of 50~200° C./s (such as 50~150° C./s),
   D) hot-dipping aluminum-zinc or hot-dipping zinc-aluminum-magnesium
   Where after the strip steel or steel plate is rapidly cooled to 580~600° C., it is immersed in a zinc pot for hot-dipping aluminum-zinc or hot-dipping zinc-aluminum-magnesium;
   E) after hot-dipping aluminum-zinc, the strip steel or steel plate is rapidly cooled to room temperature at a cooling rate of 30~200° C./s (such as 30~150° C./s) to obtain a hot-dip aluminum-zinc AZ product; or
   after hot-dipping zinc-aluminum-magnesium, the steel plate is rapidly cooled to room temperature at a cooling rate of 10~300° C./s (30~180° C./s) to obtain a hot-dip zinc-aluminum-magnesium AM product.

Preferably, a total time of the rapid heat treatment and hot-dipping aluminum-zinc or hot-dipping zinc-aluminum-magnesium is 29~159 s, preferably 29~122 s.

Preferably, in some embodiments, the process is used for manufacturing the dual phase according to any embodiment described herein comprising the following chemical components in mass percentages: C: 0.045~0.105%, Si: 0.1~0.4%, Mn: 1.0~1.5%, P≤0.02%, S≤0.006%, Al: 0.02~0.055%, optionally one or two of Cr, Mo, Ti, Nb, V, and Cr+Mo+Ti+Nb+V≤0.3%, with a balance of Fe and other unavoidable impurities, wherein after hot-dipping aluminum-zinc, the strip steel or steel plate is rapidly cooled to room temperature at a cooling rate of 30~200° C./s to obtain a hot-dip aluminum-zinc AZ product; or after hot-dipping zinc-aluminum-magnesium, the strip steel or steel plate is rapidly cooled to room temperature at a cooling rate of 30~180° C./s to obtain a hot-dip zinc-aluminum-magnesium AM product. Preferably, the total time of the rapid heat treatment and hot-dipping aluminum-zinc or hot-dipping zinc-aluminum-magnesium is 29~122 s.

Preferably, in some embodiments, the process is used for manufacturing the dual phase according to any embodiment described herein comprising the following chemical components in mass percentages: C: 0.05~0.12%, Si: 0.1~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities, wherein after hot-dipping aluminum-zinc, the strip steel or steel plate is rapidly cooled to room temperature at a cooling rate of 30~150° C./s to obtain a hot-dip aluminum-zinc AZ product; or after hot-dipping zinc-aluminum-magnesium, the strip steel or steel plate is rapidly cooled to room temperature at a cooling rate of 10~300° C./s to obtain a hot-dip zinc-aluminum-magnesium AM product.

Preferably, the total time of the rapid heat treatment and hot-dipping aluminum-zinc or hot-dipping zinc-aluminum-magnesium is 29~159 s.

Preferably, in step 2), a hot rolling finishing temperature is ≥$A_{r3}$.

Preferably, in step 2), the coiling temperature is 580~650° C.

Preferably, in step 3), the cold rolling reduction rate is 60~80%.

Preferably, in step 4), when the rapid heating is performed in one stage, the heating rate is 50~300° C./s.

Preferably, in step 4), the rapid heating is performed in two stages, wherein the strip steel or steel plate is heated in the first stage from room temperature to 550~650° C. at a heating rate of 15~300° C./s, heated in the second stage from 550~650° C. to 750~845° C. at a heating rate of 50~300° C./s.

Preferably, in step 4), the rapid heating is performed in two stages, wherein the strip steel or steel plate is heated in the first stage from room temperature to 550~650° C. at a heating rate of 30~300° C./s, heated in the second stage from 550~650° C. to 750~845° C. at a heating rate of 80~300° C./s.

Preferably, in step 4), the final temperature after rapid heating is 770~830° C.

Preferably, in the soaking process of step 4), after the strip steel or steel plate is heated to the target temperature of dual phase region of austenite and ferrite, the temperature is kept unchanged for soaking.

Preferably, in the soaking process of step 4), the strip steel or steel plate is slightly heated up or cooled down in the soaking time, wherein the temperature after heating is no more than 845° C. and the temperature after cooling is no less than 750° C.

Preferably, the soaking time is 10~40 s.

In the manufacturing process by rapid heat treatment of the 590 Mpa grade hot-dip aluminum-zinc or hot-dip zinc-aluminum-magnesium dual-phase steel with high formability according to the present disclosure:

1. Heating Rate Control

The recrystallization kinetics of the continuous heating process can be quantitatively described by the relationship affected by the heating rate. The function of the volume fraction of ferrite recrystallization and the temperature T during continuous heating process is:

$$X(T) = 1 - \exp[-n/\beta^n \int T_{star}^T b(T)(T - T_{star})^{n-1} dT]$$

where X(t) is the volume fraction of ferrite recrystallization; n is the Avrami index, which is related to the phase transition mechanism, depending on the decay period of the recrystallization nucleation rate, generally 1~4; T is the heat treatment temperature; $T_{star}$ is the recrystallization starting temperature; R is the heating rate; b(T) is obtained by:

$$b = b_0 \exp(-Q/RT)$$

From the above formula and relevant experimental data, it can be concluded that with the increase of heating rate, the recrystallization starting temperature ($T_{star}$) and finishing temperature ($T_{fin}$) increase. When the heating rate is equal to or more than 50° C./s, the austenite phase transition overlaps the recrystallization process, and the recrystallization temperature increases to the dual-phase zone temperature. The faster the heating rate, the higher the ferrite recrystallization temperature.

Slow heating is adopted in the traditional heat treatment process. In this case, the deformed matrix recovers, recrystallizes and the grain grows sequentially. Then the phase transition from ferrite to austenite occurs. The phase nucleus point is mainly at the grain boundary of the ferrite that has grown up and the nucleation rate is low. The final resultant grain structure is relatively coarse.

Under the condition of rapid heating, the phase transformation of ferrite to austenite begins to occur as soon as the deformed matrix has not yet completed the recovery or austenite phase transition begins to occur as soon as the recrystallization has just been completed and the grain has not grown up. Because the grain is fine and the grain boundary area is large when the recrystallization is just completed, the phase deformation nucleation rate is significantly increased and the austenite grain is significantly refined. Especially after ferrite recrystallization overlaps with austenite phase transition processes, because a large number of crystal defects such as dislocations and the like are retained in the ferrite crystal, a large number of nucleation points are provided for austenite, so that the austenite nucleation is explosive and the austenite grains are further refined. The high-density dislocational line defects retained at the same time also become channels for the high-rate diffusion of carbon atoms to allow each austenite grain to be quickly generated and grow up, so the austenite volume fraction increases.

The fine control of microstructure evolution, alloying elements and phase component distribution during rapid heating process provides a good basis for the subsequent austenite microstructure growth in soaking process, the distribution of alloy components and the phase transition from austenite to martensite in the rapid cooling process. The final product structure with refined grains, reasonable elements and phase distribution can be obtained finally. Comprehensively considering the effect of rapid heating and grain refinement, manufacturing cost and manufacturability, the heating rate is set at 15~500° C./s for one-stage rapid heating, and 30~500° C./s when two-stage rapid heating is adopted in the present disclosure.

Due to the different effects of rapid heating on the microstructure evolution process of material recovery, recrystallization and grain growth in different temperature zones, in order to obtain optimal microstructure control, the preferred heating rate is different in different heating temperature zones: the heating rate has the greatest impact on the recovery process from 20° C. to 550~650° C. and the heating rate is controlled at 15~500° C./s, and further preferably 30~500° C./s. When the heating temperature is from 550~650° C. to austenitizing temperature 750~845° C., the heating rate has the greatest effect on the grain growth process and the heating rate is controlled at 50~500° C./s, further preferably 80~500° C./s.

2. Soaking Temperature Control

The soaking temperature usually depends on the C content. The C content of the dual-phase steel in the present disclosure is 0.045~0.12%, and the $A_{C1}$ and $A_{C3}$ of the steel in the present disclosure are about 730° C. and 870° C., respectively. In the rapid heat treatment process of the present disclosure, the strip steel is rapidly heated to the temperature between $A_{C1}$ and $A_{C3}$ by rapid heat treatment process for soaking. The use of rapid heating technology allows a large number of dislocations to be retained in the ferrite that is not fully recrystallized, providing a greater nucleation driving force for austenite transformation. Therefore, compared with the traditional continuous annealing process, the rapid heat treatment process of the present disclosure can provide more and finer austenite structure.

With respect to the control of soaking temperature, the present disclosure first proposes rising and decreasing the soaking temperature within a certain range: that is, the soaking temperature rises slantwise and decreases slantwise in the soaking process, but the soaking temperature must be kept within a certain range. The advantage of this is that the rapid heating and cooling process in the temperature range of the two-phase region is actually to further increase the degree of superheat and the degree of supercooling to facilitate the rapid phase transition process. When the amplitude and rate of temperature ramp and temperature drop are large enough, the grains can be further refined by repeated ferrite to austenite phase transformation and austenite to ferrite phase transformation. At the same time, it has a certain influence on carbide formation and uniform distribution of alloying elements, finally forming a finer structure and alloying elements with uniform distribution.

After cold rolling, there are a large number of undissolved fine uniformly distributed carbides in dual-phase steel, which can mechanically impede the growth of austenite grains during heating process, and is conducive to refining the grain size of high strength steel. However, if the soaking temperature is too high, the number of undissolved carbides will be greatly reduced, which weakens this impedance, increase the growth tendency of grains, and thereby reduce the strength of steel. When the number of undissolved carbides is too large, it may cause aggregation, resulting in uneven local distribution of chemical components, and when the carbon content at the aggregation is too high, it will also cause local overheating. Therefore, ideally, a small quantity of fine granular undissolved carbides should be evenly distributed in the steel, which can not only prevent the abnormal growth of austenite grains, but also increase the content of each alloying element in the matrix accordingly, so as to improve the mechanical properties such as strength and toughness of alloy steel.

The selection of soaking temperature should also be aimed at obtaining fine and uniform austenite grains and avoiding coarse austenite grains, so that the purpose of obtaining fine martensitic structure after cooling can be achieved. Too high soaking temperature will make the austenite grains coarse, and the martensitic structure obtained after rapid cooling will also be coarse, resulting in poor mechanical properties of steel. It will also increase the amount of residual austenite, reduce the amount of martensite and reduce the hardness and wear resistance of steel. Too low soaking temperature also makes carbon dissolved in austenite and alloying elements in austenite insufficient, so that the concentration of alloying elements in austenite is unevenly distributed, which greatly reduces the hardenability of steel and adversely affects the mechanical properties of steel. The soaking temperature of hypoeutectoid steel should be $A_{c3}+30~50°$ C. For ultra-high-strength steels, the presence of carbide-forming elements will impede the transformation of carbides, so the soaking temperature can be appropriately increased. Based on the above factors, the soaking temperature is selected to be 750~845° C. in the present disclosure and it is expected to obtain a more ideal and reasonable final structure.

3. Soaking Time Control

The factors that influence the soaking time also depend on the content of carbon and alloying elements in steel. When the content increases, it will not only lead to a decrease in thermal conductivity of steel, but also because the diffusion rate of alloying elements is slower than carbon element, the alloying elements will significantly delay microstructure transformation of steel, then it is necessary to appropriately extend the holding time. Since rapid heating is adopted in the present process and the material contains a large number of residual dislocations in the dual-phase region, it provides a large number of nucleation points for austenite formation and a rapid diffusion channel for carbon atoms, so that austenite can be formed extremely quickly. Moreover, the shorter the soaking time, the shorter the diffusion distance of carbon atoms, the greater the carbon concentration gradient in austenite, and the more residual austenite carbon content is retained at the end. However, if the soaking and holding time is too short, the distribution of alloying elements in the steel will be uneven, resulting in insufficient austenitization. If the holding time is too long, it is easy to lead to coarse austenite grains. The influencing factors of the soaking and holding time also depend on the content of carbon and alloying elements in the steel. When the content increases, it will not only lead to a decrease in the thermal conductivity of the steel, but also because the alloying elements have slower diffusion rate than carbon, the alloying elements will significantly delay the microstructure transformation of the steel, then it is necessary to appropriately extend the holding time. Therefore, the control of soaking time needs to be determined by strictly combining with soaking temperature and comprehensively considering rapid cooling and rapid heating process, in order to finally obtain the ideal structure and element distribution. In summary, the holding time is set to be 10~60 s in the present disclosure.

4. Rapid Cooling Rate Control

The control of rapid cooling process needs to be comprehensively considered by combining the factors such as structure evolution and the alloy diffusion distribution results in the early heating and soaking processes to ensure that ideal material structure of each phase and reasonable distribution of elements is finally obtained.

In order to obtain enough martensitic strengthening phase, the cooling rate of the specimen upon quenching must be greater than the critical cooling rate to obtain martensite structure. The critical cooling rate mainly depends on the material composition. The Si content in the present disclosure is 0.1~0.5%. The Mn content is 1.0~2.0%. The content is relatively high. Thus, Si and Mn greatly strengthen the hardenability of dual-phase steel and reduce the critical cooling rate. Meanwhile, the selection of cooling rate also needs to comprehensively consider the microstructure evolution of heating process and soaking process and alloy diffusion distribution results, so as to finally obtain a reasonable distribution of each phase and alloying elements. Too low cooling rate cannot provide martensitic structure. It will lead to a decrease in strength and thus the mechanical properties cannot meet the requirements. Too high cooling rate will produce large quenching stress (i.e. structure stress and thermal stress), and it is even easy to lead to deformation and even cracking of the sample. Therefore, the rapid cooling rate is set at 50~150° C./s, in the present disclosure.

For high strength hot-dip aluminum-zinc or hot-dip zinc-aluminum-magnesium product, the rapid heat treatment process reduces the residence time of strip steel in high temperature furnace, so that the enrichment of alloying elements on the surface of high-strength strip is significantly reduced during heat treatment process, which is conducive to the improvement of the platability of high-strength hot-galvanized products, and thus conducive to reducing surface skip plating defects and improving corrosion resistance, thereby improving the yield rate of high-strength hot-galvanized products. In addition, due to the refinement of product grain and the reduction of alloy content of the material, the processing formability such as hole-expanding performance and bending performance of the dual-phase steel product obtained by the technology of the present disclosure and the use performance such as welding performance have also been improved.

The rapid heat treatment process technology reduces the time of heating process and soaking process, shortens the length of the furnace (at least shorten by one third compared with traditional continuous annealing furnace), and reduces the number of furnace rolls, so that the probability of surface defects generated in the furnace is reduced and thus the surface quality of the product is significantly improved.

Advantages of the present disclosure over traditional techniques are as follows:

(1) In the present disclosure, the recovery of deformed structure and ferrite recrystallization during heat treatment process is inhibited by rapid heat treatment, so that the recrystallization overlaps with the austenite phase transition. It increases the nucleation points of the recrystallized grain and austenite grain and shortens the grain growth time. The resultant metallographic structure of the dual-phase steel is the dual-phase structure of uniformly distributed ferrite and martensite. The fine martensite in the structure after rapid heat treatment is characterized by a variety of forms such as block, strip, granular, etc., and the distribution is more uniform, so that the dual phase steel product can have a good matching of strength and plasticity.

(2) Compared with the hot-galvanized dual-phase steel obtained by traditional continuous annealing hot-galvanizing, under the premise that the manufacturing conditions of previous process are unchanged, the average grain size of the dual-phase steel obtained by rapid heat treatment of the present disclosure is 1~5 μm, and good fine-grain strengthening effect can be obtained. The resultant dual-phase steel has a yield strength of 300~560 MPa, a tensile strength of 590~860 MPa, an elongation of 20~30%, a product of strength and elongation of 15~21 GPa % and a strain hardening index $n_{90}$ value greater than 0.20.

(3) According to the present disclosure, the total time of heat treatment in the rapid heat treatment process of low carbon low alloy hot-galvanized dual-phase steel with high formability can be shortened to 29~159 s, which greatly reduces the time of the entire heat treatment process (the time of traditional continuous annealing process is usually 300~480 s), improves production efficiency and reduces energy consumption and production costs.

(4) In terms of production cost and manufacturing difficulty, compared with the traditional dual-phase steel and its heat treatment process, the rapid heat treatment process of the present disclosure shortens the length of heating section and soaking section (at least by one third compared with traditional continuous annealing furnace) of the continuous hot-galvanizing annealing furnace, the time thereof and the total processing time of heat treatment. It can conserve energy, reduce emission and energy consumption, significantly reduce the one-time investment of furnace equipment, and significantly reduce the cost of production operation and equipment maintenance. In addition, the production of products with the same strength grade through rapid heat treatment can reduce the alloy content, the production cost of heat treatment and the process before heat treatment, and the manufacturing difficulty of each process before heat treatment.

(5) In terms of product quality, compared with the dual-phase steel obtained by the traditional continuous annealing treatment, the rapid heat treatment process technology reduces the time of heating process and soaking process, shortens the length of the furnace, and reduces the number of furnace rolls, so that the probability of surface defects generated in the furnace is reduced and thus the surface quality of the product is significantly improved. For high-strength hot-dip aluminum-zinc and hot-dip zinc-aluminum-magnesium products, the rapid heat treatment process reduces the residence time of strip steel in the high-temperature furnace, so the enrichment of alloying elements on the surface of high-strength strip is significantly reduced during heat treatment process, which is conducive to the improvement of product platability, and thus conducive to the reduction of surface skip plating defects and the improvement of corrosion resistance of high-strength hot-dip aluminum-zinc and hot-dip zinc-aluminum-magnesium products, thereby improving the yield rate. In addition, due to the refinement of the product grain and the reduction of alloy content in the material, the processing formability, such as hole-expanding performance and bending performance, of the dual-phase steel obtained by the technology of the present disclosure and the use performance such as welding performance have also been improved.

(6) Compared with the hot-galvanized dual-phase steel obtained by traditional heat treatment, the user performance such as forming, welding, coating and corrosion resistance of hot-dip aluminum-zinc and hot-dip zinc-aluminum-magnesium dual-phase steel obtained by the technology of the present disclosure is also improved, of which the corrosion resistance is 3~8 times that of traditional GI dual phase steel.

In summary, the hot-galvanized dual-phase steel with high formability obtained by the present disclosure are of great value to the healthy development of a new generation of lightweight automobiles, trains, ships, aircrafts and other vehicles and the healthy development of corresponding industries and advanced manufacturing industries.

DETAILED DESCRIPTION

The present disclosure is further explained below in reference to the Examples and the accompanying drawings. The Examples are implemented in accordance with the technical solution of the present disclosure. Detailed embodiments and specific operation process are provided, but the protection scope of the present disclosure is not limited to the Examples described below.

In the Examples, yield strength, tensile strength and elongation were tested on P7 specimen transversely according to GB/T228.1-2010 Metallic materials-Tensile testing-Part 1: Method of test at room temperature. n90 was tested on the P7 specimen transversely according to GB/T228.1-2010 Metallic materials-Tensile testing-Part 1: Method of test at room temperature and n90 value was obtained according to GBT 5028-2008 Metallic materials—Sheet and strip—Determination of tensile strain hardening exponent.

Example I

The composition of the test steel of the present disclosure is shown in Table 1. The specific parameters of the one-stage rapid heat treatment example and the traditional processes in the present example are shown in Table 2. The specific parameters of the two-stage rapid heat treatment example and the traditional processes in the present example are shown in Table 3. The main performances of the dual phase steel prepared from the test steel composition of this example according to the one-stage rapid heat treatment example and the traditional processes are listed in Table 4. The main performances of the dual phase steel prepared from the test steel composition of this example according to the two-stage rapid heat treatment example and the traditional processes are listed in Table 5.

It can be seen from Table 1-Table 5 that the process of the present disclosure can reduce the alloy content in the same grade of steel, refine grains, and obtain a matching of material structure and composition with strength and toughness. The dual-phase steel obtained by the process of the present disclosure has a yield strength of 304~398 MPa, a tensile strength of 630~698 MPa, an elongation of 22.3~29.4%, a product of strength and elongation of 15.3~19.4 GPa %, and a strain hardening index $n_{90}$ value of greater than 0.21.

Figure 1:
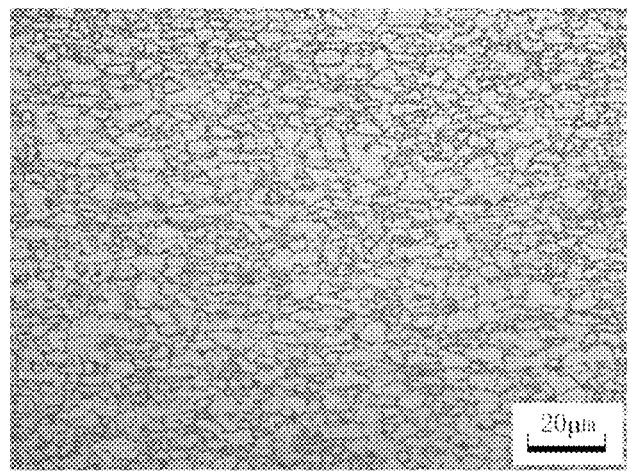
FIG. 1 is a microstructure photo of a hot-dip zinc-aluminum-magnesium dual-phase steel (AM) produced from test steel A of Example I according to Example 1 (heating in one stage) of the present disclosure.
Figure 2:
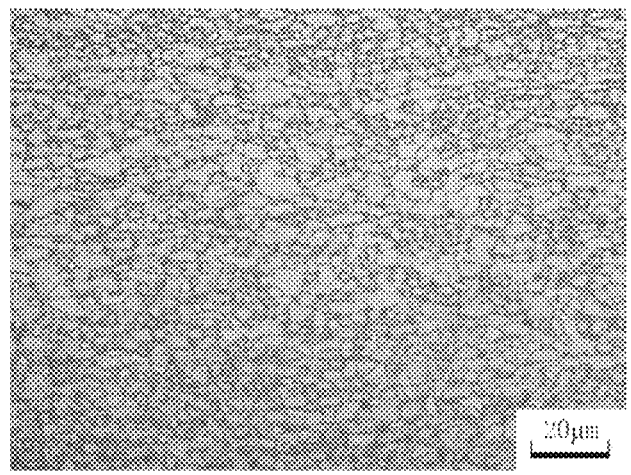
FIG. 2 is a microstructure photo of a hot-dip aluminum-zinc dual-phase steel (AZ) produced from test steel A of Example I according to Example 1 (heating in two stages) of the present disclosure.
Figure 3:
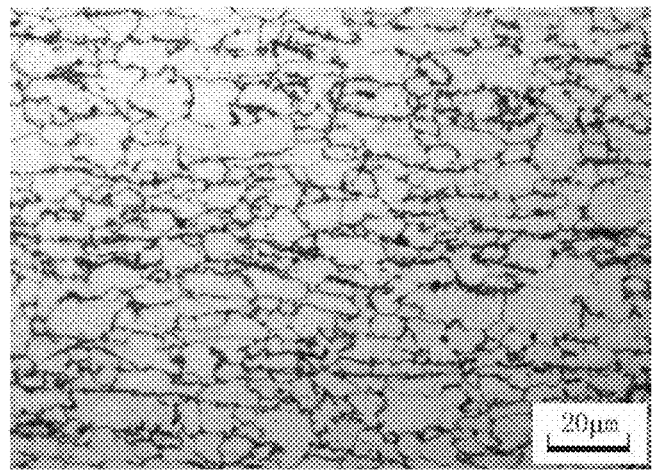
FIG. 3 is a microstructure photo of a hot-dip aluminum-zinc dual-phase steel (AZ) produced from test steel A of Example I according to traditional process 1 of the present disclosure.
Figure 4:
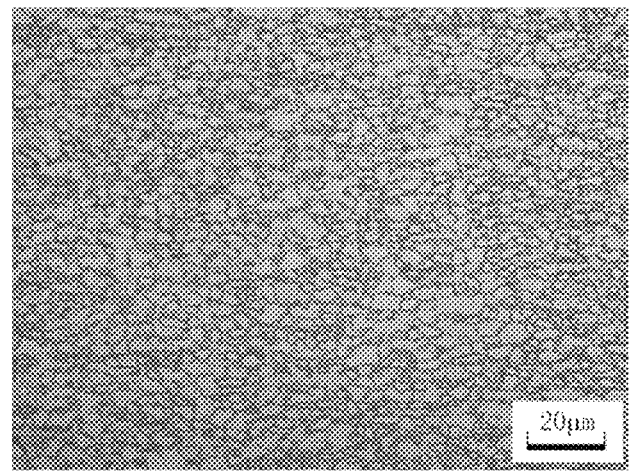
FIG. 4 is a microstructure photo of a hot-dip aluminum-zinc dual-phase steel (AZ) produced from test steel I of Example I according to Example 3 (heating in two stages) of the present disclosure.
Figure 5:
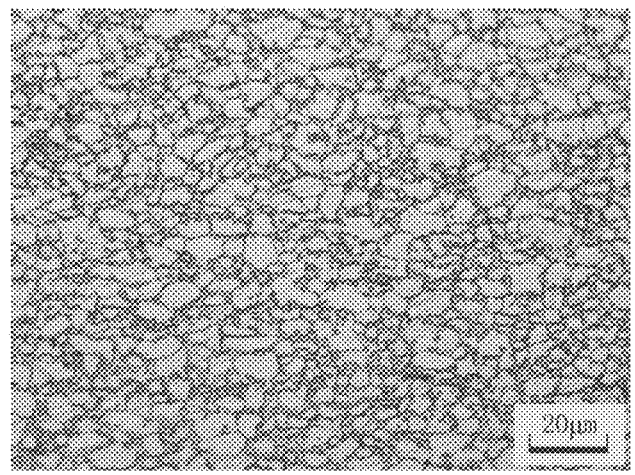
FIG. 5 is a microstructure photo of a hot-dip zinc-aluminum-magnesium dual-phase steel (AM) produced from test steel C of Example I according to Example 15 (heating in two stages) of the present disclosure.

FIG. 1 is a microstructure photo of hot-dip zinc-aluminum-magnesium dual phase steel AM produced from test steel A of this example according to Example 1 (heating in one stage). FIG. 2, FIG. 3 are structure photos of A steel having a typical composition obtained by Example 1 and comparative traditional process 1 (heating in two stages). FIG. 4 is a microstructure photo of hot-dip aluminum-zinc dual phase steel AZ produced from I steel of this example according to Example 3 (heating in two stages). FIG. 5 is a microstructure photo of hot-dip zinc-aluminum-magnesium dual phase steel AM produced from C steel of this example according to Example 15 (heating in two stages).

It can be seen from FIG. 1-FIG. 5 that all structures of material are composed of ferrite, martensite and a small amount of carbide. As shown in FIG. 3, the microstructure treated by traditional process is characterized in that the grains are coarse, there is a certain banded structure with martensite and carbide distributed in a network along ferrite grain boundary, the ferrite grain is relatively coarse, and the distribution of dual-phase structure of ferrite and martensite is uneven.

TABLE 1 unit: mass percentage

| test steel | C | Si | Mn | Cr | Mo | Ti | Nb | V | P | S | Al |
|---|---|---|---|---|---|---|---|---|---|---|---|
| A | 0.045 | 0.10 | 1.50 | / | / | / | / | / | 0.0105 | 0.0045 | 0.0372 |
| B | 0.055 | 0.21 | 1.46 | / | / | / | / | / | 0.0136 | 0.0059 | 0.0404 |
| C | 0.084 | 0.33 | 1.35 | / | / | / | / | / | 0.0124 | 0.0042 | 0.0402 |
| D | 0.105 | 0.40 | 1.02 | / | / | / | / | / | 0.0149 | 0.0056 | 0.0494 |
| E | 0.051 | 0.17 | 1.27 | 0.24 | / | / | / | / | 0.0200 | 0.0049 | 0.0496 |
| F | 0.062 | 0.25 | 1.56 | / | 0.15 | / | / | / | 0.0136 | 0.0041 | 0.0515 |
| G | 0.082 | 0.18 | 1.35 | / | / | 0.021 | / | / | 0.0160 | 0.0044 | 0.0491 |
| H | 0.103 | 0.28 | 1.26 | / | / | / | 0.023 | / | 0.0150 | 0.0057 | 0.0377 |
| I | 0.098 | 0.19 | 1.16 | / | / | / | / | 0.026 | 0.0156 | 0.0053 | 0.0508 |
| J | 0.046 | 0.27 | 1.48 | 0.13 | 0.15 | / | / | / | 0.0177 | 0.0041 | 0.0403 |
| K | 0.066 | 0.15 | 1.49 | 0.25 | / | 0.017 | / | / | 0.0119 | 0.0024 | 0.0489 |
| L | 0.101 | 0.18 | 1.44 | 0.21 | / | / | 0.020 | / | 0.0098 | 0.0035 | 0.0390 |
| M | 0.095 | 0.25 | 1.26 | 0.24 | / | / | / | 0.021 | 0.0095 | 0.0060 | 0.0351 |
| N | 0.076 | 0.36 | 1.37 | / | 0.17 | 0.022 | / | / | 0.0103 | 0.0026 | 0.0378 |
| O | 0.088 | 0.13 | 1.50 | / | 0.14 | / | 0.015 | / | 0.0119 | 0.0049 | 0.0338 |
| P | 0.102 | 0.21 | 1.38 | / | 0.15 | / | / | 0.020 | 0.0195 | 0.0050 | 0.0341 |
| Q | 0.086 | 0.12 | 1.47 | / | / | 0.016 | 0.020 | / | 0.0137 | 0.0053 | 0.0425 |
| R | 0.102 | 0.28 | 1.49 | / | / | 0.020 | / | 0.021 | 0.0177 | 0.0048 | 0.0377 |
| S | 0.097 | 0.23 | 1.44 | / | / | / | 0.015 | 0.020 | 0.0141 | 0.0034 | 0.0365 |

TABLE 2

| | Coiling temperature °C. | Cold rolling reduction rate % | Rapid heating rate (one stage) °C./s | Soaking temperature °C. | Soaking times | Slow cooling rate °C./s | End temperature of slow cooling °C. | Rapid cooling rate °C/s | Hot dipping temperature °C. | Final cooling rate °C./s | total time of rapid heat treatment and hot-dipping aluminum-zinc or hot-dipping zinc-aluminum-magnesiums |
|---|---|---|---|---|---|---|---|---|---|---|---|
| Ex.1 | 650 | 40 | 15 | 750 | 60 | 15 | 670 | 50 | 585 | 100 | 121.35 |
| Ex.2 | 630 | 80 | 30 | 770 | 50 | 13 | 690 | 60 | 590 | 80 | 89.95 |
| Ex.3 | 620 | 70 | 80 | 790 | 40 | 11 | 700 | 80 | 591 | 75 | 66.78 |
| Ex.4 | 610 | 60 | 150 | 800 | 30 | 9 | 730 | 100 | 593 | 50 | 58.16 |
| Ex.5 | 580 | 65 | 300 | 840 | 10 | 15 | 770 | 120 | 585 | 60 | 28.71 |
| Ex.6 | 590 | 55 | 500 | 845 | 20 | 5 | 750 | 150 | 590 | 30 | 58.70 |
| Ex.7 | 640 | 45 | 450 | 795 | 55 | 12 | 695 | 140 | 585 | 70 | 73.91 |
| Ex.8 | 590 | 63 | 350 | 790 | 45 | 8 | 670 | 130 | 590 | 90 | 69.15 |
| Ex.9 | 570 | 55 | 400 | 815 | 35 | 10 | 675 | 100 | 597 | 120 | 56.58 |
| Ex.10 | 560 | 75 | 250 | 830 | 25 | 14 | 710 | 200 | 598 | 100 | 43.15 |
| Traditional process 1 | 650 | 79 | 11 | 770 | 160 | 10 | 675 | 100 | 585 | 30 | 253.60 |
| Traditional process 2 | 630 | 76 | 10 | 790 | 130 | 9 | 675 | 80 | 590 | 60 | 226.12 |
| Traditional process 3 | 620 | 70 | 11 | 810 | 110 | 10 | 675 | 75 | 597 | 100 | 198.31 |
| Traditional process 4 | 610 | 65 | 13 | 830 | 90 | 8 | 675 | 60 | 598 | 150 | 174.80 |
| Traditional process 5 | 580 | 60 | 15 | 845 | 70 | 12 | 675 | 50 | 586 | 200 | 143.78 |
| Traditional process 6 | 650 | 79 | 11 | 770 | 160 | 10 | 675 | 100 | 585 | 30 | 269.82 |
| Traditional process 7 | 630 | 76 | 10 | 790 | 130 | 9 | 675 | 80 | 600 | 60 | 231.44 |
| Traditional process 8 | 620 | 70 | 11 | 810 | 110 | 10 | 675 | 75 | 590 | 90 | 198.97 |
| Traditional process 9 | 610 | 65 | 13 | 830 | 90 | 8 | 675 | 60 | 580 | 140 | 174.24 |
| Traditional process 10 | 580 | 60 | 15 | 845 | 70 | 12 | 675 | 50 | 585 | 180 | 141.86 |

TABLE 3

| | Coiling temperature °C. | Cold rolling reduction rate % | Heating rate in the first stage °C./s | Temperature after heating in the first stage °C. | Heating rate in the second stage °C./s | Soaking temperature °C. | Soaking times | Slow cooling rate °C./s | End temperature of slow cooling °C. | Rapid cooling rate °C./s | Hot dipping temperature °C. | Final Cooling rate °C./s | Total time of rapid heat treatment and hot-dipping aluminum-zinc or hot-dipping zinc-aluminum-magnesiums |
|---|---|---|---|---|---|---|---|---|---|---|---|---|---|
| Ex.1 | 650 | 40 | 15 | 550 | 500 | 750 | 60 | 15 | 670 | 50 | 585 | 100 | 108.42 |
| Ex.2 | 630 | 80 | 30 | 570 | 300 | 770 | 50 | 13 | 690 | 60 | 590 | 80 | 83.95 |
| Ex.3 | 620 | 70 | 80 | 600 | 150 | 790 | 40 | 11 | 700 | 80 | 591 | 75 | 65.67 |
| Ex.4 | 610 | 60 | 150 | 630 | 80 | 800 | 30 | 9 | 730 | 100 | 593 | 50 | 59.27 |
| Ex.5 | 580 | 65 | 300 | 640 | 50 | 840 | 10 | 15 | 770 | 120 | 585 | 60 | 29.54 |
| Ex.6 | 590 | 55 | 500 | 650 | 30 | 845 | 20 | 5 | 750 | 150 | 590 | 30 | 64.49 |
| Ex.7 | 640 | 45 | 450 | 647 | 400 | 795 | 55 | 12 | 695 | 140 | 585 | 70 | 73.95 |
| Ex.8 | 590 | 63 | 350 | 635 | 450 | 790 | 45 | 8 | 670 | 130 | 590 | 90 | 69.05 |
| Ex.9 | 570 | 55 | 400 | 640 | 350 | 815 | 35 | 10 | 675 | 100 | 597 | 120 | 56.64 |
| Ex.10 | 560 | 75 | 250 | 620 | 250 | 830 | 25 | 14 | 710 | 200 | 598 | 100 | 43.39 |
| Ex.11 | 600 | 72 | 100 | 580 | 150 | 820 | 30 | 7 | 675 | 170 | 586 | 150 | 62.43 |
| Ex.12 | 550 | 50 | 200 | 610 | 200 | 835 | 20 | 6 | 720 | 180 | 585 | 200 | 47.29 |
| Ex.13 | 650 | 40 | 15 | 550 | 500 | 750 | 60 | 15 | 670 | 70 | 590 | 30 | 120.18 |
| Ex.14 | 630 | 80 | 30 | 570 | 300 | 770 | 50 | 13 | 690 | 50 | 591 | 60 | 86.65 |
| Ex.15 | 620 | 70 | 80 | 600 | 150 | 790 | 40 | 11 | 710 | 80 | 593 | 90 | 63.62 |

TABLE 3-continued

| | | | Rapid heat treatment (two-stage) | | | | | | | | | Total time of rapid heat treatment |
|---|---|---|---|---|---|---|---|---|---|---|---|---|
| | | Rapid heating (two-stage) | | | | | Slow cooling | | | | | and |
| | | | Temperature after | Heating rate in | Soaking | | | End temperature | | Hot dipping | | hot-dipping aluminum-zinc or hot-dipping zinc-aluminum-magnesiums |
| | Coiling temperature °C. | Cold rolling reduction rate % | Heating rate in the first stage °C./s | heating in the first stage °C. | the second stage °C./s | Soaking temperature °C. | Soaking times | Slow cooling rate °C./s | of slow cooling °C. | Rapid cooling rate °C./s | dipping temperature °C. | Final Cooling rate °C./s | |
| Ex.16 | 610 | 60 | 150 | 630 | 80 | 820 | 30 | 9 | 730 | 100 | 585 | 150 | 51.66 |
| Ex.17 | 580 | 65 | 300 | 640 | 50 | 845 | 10 | 6 | 770 | 120 | 590 | 180 | 33.17 |
| Traditional process 1 | 650 | 79 | 11 | 150 | 8 | 770 | 160 | 10 | 675 | 100 | 585 | 30 | 273.75 |
| Traditional process 2 | 630 | 76 | 10 | 150 | 7 | 790 | 130 | 9 | 675 | 80 | 590 | 60 | 252.69 |
| Traditional process 3 | 620 | 70 | 11 | 180 | 6 | 810 | 110 | 10 | 675 | 75 | 597 | 100 | 244.52 |
| Traditional process 4 | 610 | 65 | 13 | 210 | 5 | 830 | 90 | 8 | 675 | 60 | 598 | 150 | 249.88 |
| Traditional process 5 | 580 | 60 | 15 | 250 | 5 | 845 | 70 | 12 | 675 | 50 | 586 | 200 | 223.11 |
| Traditional process 6 | 650 | 79 | 11 | 150 | 8 | 770 | 160 | 10 | 675 | 100 | 585 | 30 | 274.05 |
| Traditional process 7 | 630 | 76 | 10 | 150 | 7 | 790 | 130 | 9 | 675 | 80 | 600 | 60 | 252.73 |
| Traditional process 8 | 620 | 70 | 11 | 180 | 6 | 810 | 110 | 10 | 675 | 75 | 590 | 90 | 245.18 |
| Traditional process 9 | 610 | 65 | 13 | 210 | 5 | 830 | 90 | 8 | 675 | 60 | 580 | 140 | 250.32 |
| Traditional process 10 | 580 | 60 | 15 | 250 | 5 | 845 | 70 | 12 | 675 | 50 | 585 | 180 | 223.44 |

TABLE 4

| No. | test steel | Main process parameters (Rapid heating-one stage) | Yield strength (MPa) | Tensile strength (MPa) | Elongation (%) | Product of strength and elongation (MPa %) | $n_{90}$ value |
|---|---|---|---|---|---|---|---|
| 1 | A | Traditional process 1 | 348 | 616 | 24.6 | 15153.6 | 0.155 |
| 2 | A | Ex.1 | 378 | 667 | 26.5 | 17675.5 | 0.232 |
| 3 | B | Traditional process 2 | 352 | 649 | 25.2 | 16354.8 | 0.173 |
| 4 | B | Ex.2 | 373 | 668 | 25.8 | 17234.4 | 0.215 |
| 5 | C | Traditional process 3 | 365 | 659 | 25.3 | 16672.7 | 0.176 |
| 6 | C | Ex.3 | 389 | 689 | 25.6 | 17638.4 | 0.229 |
| 7 | D | Traditional process 4 | 362 | 638 | 26.2 | 16715.6 | 0.173 |
| 8 | D | Ex.4 | 375 | 647 | 25.4 | 16433.8 | 0.221 |
| 9 | E | Ex.5 | 364 | 643 | 24.8 | 15946.4 | 0.215 |
| 10 | E | Traditional process 5 | 378 | 698 | 24.9 | 17380.2 | 0.225 |
| 11 | O | Ex.6 | 362 | 648 | 25.6 | 16588.8 | 0.215 |
| 12 | O | Traditional process 6 | 385 | 686 | 25.6 | 17561.6 | 0.210 |
| 13 | L | Ex.7 | 364 | 630 | 25.9 | 16317 | 0.189 |
| 14 | L | Traditional process 7 | 380 | 685 | 25.4 | 17399 | 0.231 |
| 15 | H | Ex.4 | 375 | 638 | 25.1 | 16013.8 | 0.168 |
| 16 | H | Traditional process 8 | 398 | 685 | 25.3 | 17330.5 | 0.238 |
| 17 | Q | Ex.2 | 366 | 647 | 25.3 | 16369.1 | 0.167 |
| 18 | Q | Traditional process 9 | 386 | 689 | 25.5 | 17569.5 | 0.237 |
| 19 | R | Ex.5 | 368 | 647 | 25.3 | 16369.1 | 0.169 |
| 20 | R | Traditional process 10 | 382 | 687 | 26.3 | 18068.1 | 0.237 |
| 21 | I | Ex.1 | 383 | 675 | 25.4 | 17145 | 0.234 |
| 22 | J | Ex.2 | 354 | 678 | 25.6 | 17356.8 | 0.225 |
| 23 | N | Ex.3 | 376 | 669 | 26.5 | 17728.5 | 0.236 |
| 24 | F | Ex.4 | 358 | 672 | 25.8 | 17337.6 | 0.226 |
| 25 | K | Ex.5 | 389 | 656 | 25.7 | 16859.2 | 0.222 |
| 26 | R | Ex.6 | 373 | 668 | 26.1 | 17434.8 | 0.233 |
| 27 | G | Ex.7 | 383 | 661 | 26.4 | 17450.4 | 0.243 |

TABLE 4-continued

| No. | test steel | Main process parameters (Rapid heating-one stage) | Yield strength (MPa) | Tensile strength (MPa) | Elongation (%) | Product of strength and elongation (MPa %) | $n_{90}$ value |
|---|---|---|---|---|---|---|---|
| 28 | P | Ex.8 | 358 | 672 | 25.4 | 17068.8 | 0.236 |
| 29 | S | Ex.9 | 376 | 662 | 26.6 | 17609.2 | 0.237 |
| 30 | M | Ex.10 | 386 | 668 | 25.9 | 17301.2 | 0.232 |

TABLE 5

| No | test steel | Main process parameters (Rapid heating-two stage) | Yield strength (MPa) | Tensile strength (MPa) | Elongation (%) | Product of strength and elongation (MPa %) | $N_{90}$ value |
|---|---|---|---|---|---|---|---|
| 1 | A | Traditional process 1 | 276 | 490 | 34.6 | 16954 | 0.165 |
| 2 | A | Ex.1 | 380 | 691 | 23.7 | 16376.7 | 0.239 |
| 3 | B | Traditional process 2 | 272 | 497 | 34.8 | 17295.6 | 0.181 |
| 4 | B | Ex.2 | 369 | 698 | 26.7 | 18636.6 | 0.254 |
| 5 | C | Traditional process 3 | 255 | 527 | 36.5 | 19235.5 | 0.189 |
| 6 | C | Ex.3 | 346 | 674 | 28.4 | 19141.6 | 0.250 |
| 7 | D | Traditional process 4 | 283 | 531 | 32.6 | 17310.6 | 0.190 |
| 8 | D | Ex.4 | 310 | 658 | 28.5 | 18753 | 0.239 |
| 9 | E | Ex.5 | 350 | 667 | 27 | 18009 | 0.251 |
| 10 | E | Traditional process 5 | 287 | 570 | 33.3 | 18981 | 0.163 |
| 11 | O | Ex.6 | 367 | 646 | 28.6 | 18475.6 | 0.242 |
| 12 | O | Traditional process 4 | 294 | 523 | 31.4 | 16422.2 | 0.189 |
| 13 | L | Ex.7 | 382 | 692 | 26.9 | 18614.8 | 0.245 |
| 14 | L | Traditional process 3 | 266 | 522 | 34.1 | 17800.2 | 0.167 |
| 15 | H | Ex.4 | 339 | 638 | 28.6 | 18246.8 | 0.244 |
| 16 | H | Traditional process 4 | 292 | 518 | 36.5 | 18907 | 0.174 |
| 17 | Q | Ex.2 | 363 | 690 | 25 | 17250 | 0.252 |
| 18 | Q | Traditional process 2 | 258 | 498 | 36.5 | 18177 | 0.171 |
| 19 | I | Ex.3 | 346 | 659 | 29.4 | 19374.6 | 0.257 |
| 20 | J | Ex.4 | 304 | 656 | 29.2 | 19155.2 | 0.241 |
| 21 | N | Ex.5 | 363 | 692 | 24.3 | 16815.6 | 0.248 |
| 22 | F | Ex.6 | 371 | 685 | 24 | 16440 | 0.243 |
| 23 | K | Ex.7 | 382 | 698 | 22.6 | 15774.8 | 0.240 |
| 24 | R | Ex.8 | 375 | 687 | 22.3 | 15320.1 | 0.250 |
| 25 | G | Ex.9 | 360 | 672 | 28.5 | 19152 | 0.251 |
| 26 | P | Ex.10 | 352 | 671 | 27.9 | 18720.9 | 0.253 |
| 27 | S | Ex.11 | 350 | 673 | 24.7 | 16623.1 | 0.254 |
| 28 | M | Ex.12 | 355 | 647 | 28.3 | 18310.1 | 0.250 |
| 29 | A | Traditional process 6 | 348 | 614 | 24.3 | 14920.2 | 0.153 |
| 30 | A | Ex.13 | 378 | 665 | 26.5 | 17622.5 | 0.232 |
| 31 | B | Traditional process 7 | 352 | 648 | 25 | 16200 | 0.173 |
| 32 | B | Ex.14 | 373 | 668 | 25.6 | 17100.8 | 0.215 |
| 33 | C | Traditional process 8 | 363 | 649 | 25 | 16225 | 0.175 |
| 34 | C | Ex.15 | 386 | 687 | 25.2 | 17312.4 | 0.229 |
| 35 | D | Traditional process 9 | 352 | 631 | 26.4 | 16658.4 | 0.172 |
| 36 | D | Ex.16 | 370 | 644 | 25.4 | 16357.6 | 0.221 |
| 37 | E | Traditional process 10 | 361 | 643 | 24.1 | 15496.3 | 0.169 |
| 38 | E | Ex.17 | 375 | 698 | 24.5 | 17101 | 0.223 |
| 39 | O | Traditional process 7 | 360 | 638 | 25.1 | 16013.8 | 0.175 |
| 40 | O | Ex.14 | 381 | 684 | 25.6 | 17510.4 | 0.209 |
| 41 | L | Traditional process 8 | 364 | 630 | 25.3 | 15939 | 0.187 |
| 42 | L | Ex.15 | 379 | 682 | 25.4 | 17322.8 | 0.231 |
| 43 | H | Traditional process 9 | 375 | 635 | 24.4 | 15494 | 0.165 |
| 44 | H | Ex.16 | 398 | 685 | 25.1 | 17193.5 | 0.234 |
| 45 | Q | Traditional process 10 | 365 | 647 | 25.3 | 16369.1 | 0.167 |
| 46 | Q | Ex.17 | 382 | 687 | 25.3 | 17381.1 | 0.235 |
| 47 | I | Ex.13 | 383 | 674 | 25 | 16850 | 0.231 |
| 48 | J | Ex.14 | 354 | 675 | 25.3 | 17077.5 | 0.224 |
| 49 | N | Ex.15 | 375 | 668 | 26.1 | 17434.8 | 0.236 |
| 50 | F | Ex.16 | 358 | 669 | 25.7 | 17193.3 | 0.224 |
| 51 | K | Ex.17 | 389 | 646 | 25.7 | 16602.2 | 0.222 |
| 52 | R | Ex.16 | 372 | 667 | 25.8 | 17208.6 | 0.231 |
| 53 | G | Ex.15 | 383 | 661 | 26.4 | 17450.4 | 0.242 |
| 54 | P | Ex.14 | 356 | 669 | 25.4 | 16992.6 | 0.234 |
| 55 | S | Ex.13 | 376 | 657 | 26.6 | 17476.2 | 0.237 |
| 56 | M | Ex.17 | 388 | 668 | 25.5 | 17034 | 0.230 |

Example II

The composition of the test steel of the present disclosure is shown in Table 6. The specific parameters of the one-stage rapid heat treatment example and the traditional processes in the present example are shown in Table 7. The specific parameters of the two-stage rapid heat treatment example and the traditional processes in the present example are shown in Table 8. The main performances of the dual phase steel prepared from the test steel composition of this example according to the one-stage rapid heat treatment example and the traditional processes are listed in Table 9. The main performances of the dual phase steel prepared from the test steel composition of this example according to the two-stage rapid heat treatment example and the traditional processes are listed in Table 10.

It can be seen from Table 6-Table 10 that the process of the present disclosure can reduce the alloy content in the same grade of steel, refine grains, and obtain a matching of material structure and composition with strength and toughness. The dual-phase steel obtained by the process of the present disclosure has a yield strength of 476~556 MPa, a tensile strength of 786~852 MPa, an elongation of 20.1~24.8%, a product of strength and elongation of 16.7~20.2 GPa %, and a strain hardening index $n_{90}$ value of greater than 0.20.

Figure 6:
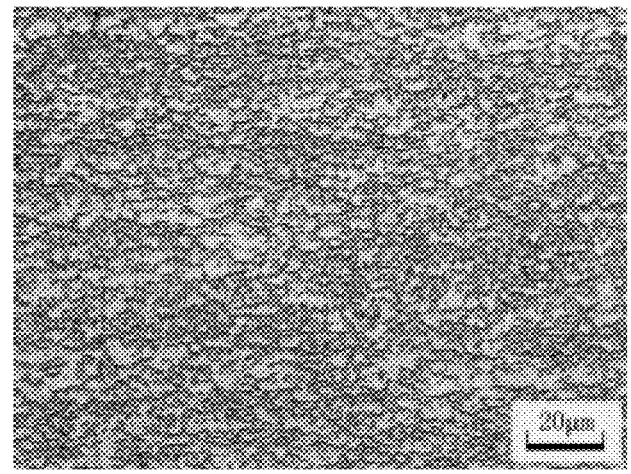
FIG. 6 is a microstructure photo of a hot-dip aluminum-zinc dual-phase steel (AZ) produced from test steel D of Example II according to Example 4 (heating in one stage) of the present disclosure.
Figure 7:
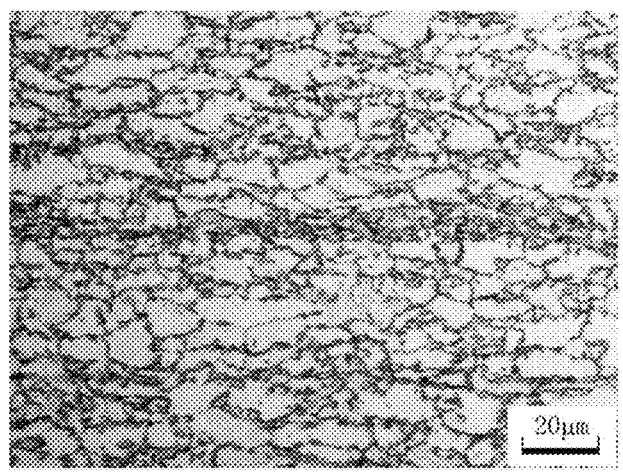
FIG. 7 is a microstructure photo of a hot-dip aluminum-zinc dual-phase steel (AZ) produced from test steel D of Example II according to traditional process 4 of the present disclosure.
Figure 8:
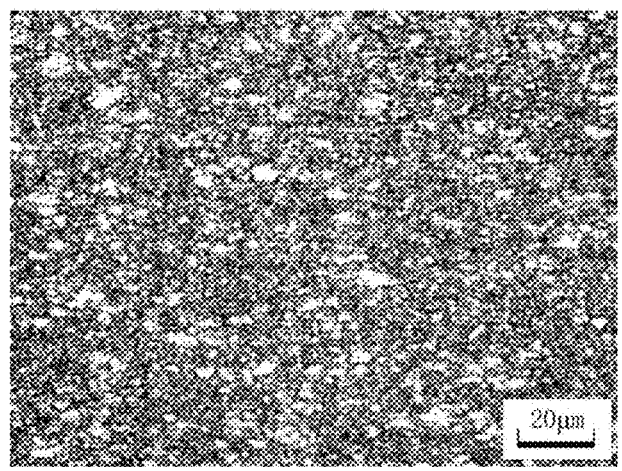
FIG. 8 is a microstructure photo of a hot-dip aluminum-zinc dual-phase steel (AZ) produced from test steel N of Example II according to Example 15 (heating in two stages) of the present disclosure.
Figure 9:
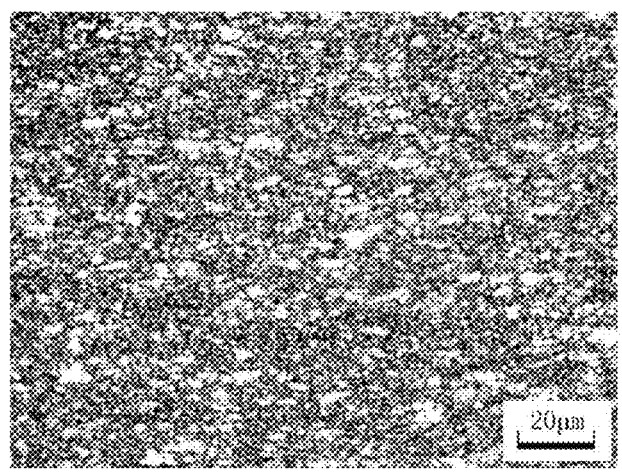
FIG. 9 is a microstructure photo of a hot-dip zinc-aluminum-magnesium dual-phase steel (AM) produced from test steel E of Example II according to Example 17 (heating in two stages) of the present disclosure.

FIG. 6, FIG. 7 are microstructure photos of hot-dip aluminum-zinc dual phase steel AZ produced from test steel D of this example according to Example 4 and comparative traditional process 4 (heating in one stage). FIG. 8 is a microstructure photo of hot-dip aluminum-zinc dual phase steel AZ produced from test steel N of this example according to Example 15 (heating in two stages). FIG. 9 is a microstructure photo of hot-dip zinc-aluminum-magnesium dual phase steel AM produced from test steel E of this example according to Example 17 (heating in two stages).

TABLE 6

(unit: mass percentage)

| test steel | C | Si | Mn | Ti | Nb | Cr | Mo | V | P | S | Al |
|---|---|---|---|---|---|---|---|---|---|---|---|
| A | 0.050 | 0.45 | 2.00 | / | / | / | / | / | 0.0135 | 0.0015 | 0.0314 |
| B | 0.070 | 0.20 | 1.91 | / | / | / | / | / | 0.0079 | 0.0020 | 0.0316 |
| C | 0.103 | 0.33 | 1.62 | / | / | / | / | / | 0.0144 | 0.0009 | 0.0269 |
| D | 0.120 | 0.42 | 1.41 | / | / | / | / | / | 0.0148 | 0.0012 | 0.0314 |
| E | 0.055 | 0.44 | 1.41 | / | / | 0.253 | 0.12 | / | 0.0118 | 0.0011 | 0.0340 |
| F | 0.068 | 0.35 | 1.63 | / | / | / | 0.13 | 0.041 | 0.0118 | 0.0015 | 0.0366 |
| G | 0.092 | 0.25 | 1.50 | 0.040 | / | 0.181 | / | / | 0.0115 | 0.0006 | 0.0297 |
| H | 0.099 | 0.42 | 1.44 | / | 0.033 | / | / | / | 0.0064 | 0.0028 | 0.0294 |
| I | 0.110 | 0.26 | 1.61 | / | / | 0.305 | / | 0.035 | 0.0133 | 0.0003 | 0.0358 |
| J | 0.103 | 0.43 | 1.23 | / | / | / | 0.1 | / | 0.0136 | 0.0018 | 0.0286 |
| K | 0.083 | 0.27 | 1.40 | 0.025 | / | / | / | / | 0.0097 | 0.0033 | 0.0276 |
| L | 0.095 | 0.35 | 1.52 | / | 0.05 | / | / | / | 0.0095 | 0.0028 | 0.0303 |
| M | 0.078 | 0.45 | 1.41 | / | / | 0.276 | / | 0.025 | 0.0099 | 0.0003 | 0.0290 |
| N | 0.069 | 0.50 | 2.00 | 0.028 | / | / | 0.12 | / | 0.0134 | 0.0008 | 0.0367 |
| O | 0.105 | 0.10 | 1.71 | / | 0.025 | / | / | / | 0.0099 | 0.0017 | 0.0290 |
| P | 0.094 | 0.23 | 1.82 | / | / | / | / | 0.05 | 0.0124 | 0.0012 | 0.0259 |
| Q | 0.089 | 0.15 | 1.72 | 0.025 | 0.030 | / | / | / | 0.0096 | 0.0011 | 0.0319 |
| R | 0.095 | 0.18 | 1.83 | 0.020 | / | / | / | 0.032 | 0.0075 | 0.0015 | 0.0285 |
| S | 0.096 | 0.31 | 1.65 | / | 0.025 | / | / | 0.03 | 0.0066 | 0.0007 | 0.0495 |

TABLE 7

| | Cold rolling | | Rapid heat treatment (one stage) | | | | | | | | total time of rapid heat treatment and hot-dipping |
|---|---|---|---|---|---|---|---|---|---|---|---|
| | | Rapid heating rate | Soaking | | Slow cooling | | Rapid | Hot dipping | Final | aluminum-zinc or hot-dipping |
| | Coiling temperature ° C. | reduction rate % | (one stage) ° C./s | Soaking temperature ° C. | Soaking times | Slow cooling rate ° C./s | End temperature of slow cooling ° C. | Rapid cooling rate ° C./s | Hot dipping temperature ° C. | Cooling rate ° C./s | zinc-aluminum-magnesiums |
| Ex.1 | 650 | 40 | 15 | 750 | 60 | 15 | 670 | 50 | 585 | 100 | 121.35 |
| Ex.2 | 630 | 80 | 30 | 770 | 50 | 13 | 690 | 60 | 590 | 80 | 89.95 |
| Ex.3 | 620 | 70 | 80 | 790 | 40 | 11 | 700 | 80 | 591 | 75 | 66.78 |
| Ex.4 | 610 | 60 | 150 | 820 | 30 | 9 | 730 | 100 | 593 | 50 | 58.16 |
| Ex.5 | 580 | 65 | 300 | 845 | 10 | 15 | 770 | 120 | 585 | 60 | 28.71 |
| Ex.6 | 590 | 55 | 500 | 835 | 20 | 5 | 750 | 150 | 590 | 30 | 58.70 |
| Ex.7 | 640 | 45 | 450 | 795 | 55 | 12 | 695 | 140 | 585 | 70 | 73.91 |
| Ex.8 | 590 | 63 | 350 | 790 | 45 | 8 | 670 | 130 | 590 | 90 | 69.15 |
| Ex.9 | 570 | 55 | 400 | 815 | 35 | 10 | 675 | 100 | 597 | 120 | 56.58 |
| Ex.10 | 560 | 75 | 250 | 830 | 25 | 14 | 710 | 200 | 598 | 100 | 43.15 |

TABLE 7-continued

| | | | Rapid heat treatment (one stage) | | | | | | | | total time of rapid heat treatment and hot-dipping aluminum-zinc or hot-dipping zinc-aluminum-magnesiums |
|---|---|---|---|---|---|---|---|---|---|---|---|
| | | Rapid | | | Slow cooling | | | | | | |
| | | Cold rolling reduction rate % | heating rate (one stage) °C./s | Soaking | | Slow cooling rate °C./s | End temperature of slow cooling °C. | Rapid cooling rate °C./s | Hot dipping temperature °C. | Final Cooling rate °C./s | |
| | Coiling temperature °C. | | | Soaking temperature °C. | Soaking times | | | | | | |
| Traditional process 1 | 650 | 79 | 11 | 750 | 160 | 10 | 675 | 100 | 585 | 30 | 253.60 |
| Traditional process 2 | 630 | 76 | 10 | 770 | 130 | 9 | 675 | 80 | 590 | 60 | 226.12 |
| Traditional process 3 | 620 | 70 | 11 | 790 | 110 | 10 | 675 | 75 | 597 | 100 | 198.31 |
| Traditional process 4 | 610 | 65 | 13 | 820 | 90 | 8 | 675 | 60 | 598 | 150 | 174.80 |
| Traditional process 5 | 580 | 60 | 15 | 845 | 70 | 12 | 675 | 50 | 586 | 200 | 143.78 |
| Traditional process 6 | 650 | 79 | 11 | 835 | 160 | 10 | 675 | 100 | 585 | 30 | 269.82 |
| Traditional process 7 | 630 | 76 | 10 | 795 | 130 | 9 | 675 | 80 | 600 | 60 | 231.44 |
| Traditional process 8 | 620 | 70 | 11 | 790 | 110 | 10 | 675 | 75 | 590 | 90 | 198.97 |
| Traditional process 9 | 610 | 65 | 13 | 815 | 90 | 8 | 675 | 60 | 580 | 140 | 174.24 |
| Traditional process 10 | 580 | 60 | 15 | 830 | 70 | 12 | 675 | 50 | 585 | 180 | 141.86 |

TABLE 8

| | | | Rapid heat treatment (two-stage) | | | | | | | | | total time of rapid heat treatment and hot-dipping aluminum-zinc or hot-dipping zinc-aluminum-magnesiums |
|---|---|---|---|---|---|---|---|---|---|---|---|---|
| | | | Rapid heating (two-stage) | | | | | Slow cooling | | | | |
| | | Cold rolling reduction rate % | Heating rate in the first stage °C./s | Temperature after heating in the first stage °C. | Heating rate in the second stage °C./s | Soaking | | Slow cooling rate °C./s | End temperature of slow cooling °C. | Rapid cooling rate °C./s | Hot dipping temperature °C. | Final cooling rate °C./s | |
| | Coiling temperature °C. | | | | | Soaking temperature °C. | Soaking times | | | | | | |
| Ex.1 | 650 | 40 | 15 | 550 | 500 | 750 | 60 | 15 | 670 | 50 | 585 | 100 | 108.42 |
| Ex.2 | 630 | 80 | 30 | 570 | 300 | 770 | 50 | 13 | 690 | 60 | 590 | 80 | 83.95 |
| Ex.3 | 620 | 70 | 80 | 600 | 150 | 790 | 40 | 11 | 700 | 80 | 591 | 75 | 65.67 |
| Ex.4 | 610 | 60 | 150 | 630 | 80 | 820 | 30 | 9 | 730 | 100 | 593 | 50 | 59.27 |
| Ex.5 | 580 | 65 | 300 | 640 | 50 | 845 | 10 | 15 | 770 | 70 | 585 | 60 | 29.54 |
| Ex.6 | 590 | 55 | 500 | 650 | 30 | 835 | 20 | 5 | 750 | 150 | 590 | 30 | 64.49 |
| Ex.7 | 640 | 45 | 450 | 647 | 400 | 795 | 55 | 12 | 695 | 140 | 585 | 70 | 73.95 |
| Ex.8 | 590 | 63 | 350 | 635 | 450 | 790 | 45 | 8 | 670 | 130 | 590 | 90 | 69.05 |
| Ex.9 | 570 | 55 | 400 | 640 | 350 | 815 | 35 | 10 | 675 | 100 | 597 | 120 | 56.64 |
| Ex.10 | 560 | 75 | 250 | 620 | 250 | 830 | 25 | 14 | 710 | 140 | 598 | 100 | 43.39 |
| Ex.11 | 600 | 72 | 100 | 580 | 150 | 820 | 30 | 7 | 675 | 120 | 586 | 120 | 63.37 |
| Ex.12 | 550 | 50 | 200 | 610 | 200 | 835 | 20 | 6 | 720 | 110 | 585 | 150 | 48.24 |
| Ex.13 | 650 | 40 | 15 | 550 | 500 | 750 | 60 | 15 | 670 | 90 | 590 | 10 | 158.96 |
| Ex.14 | 630 | 80 | 30 | 570 | 300 | 770 | 50 | 13 | 690 | 50 | 591 | 50 | 88.55 |
| Ex.15 | 620 | 70 | 80 | 600 | 150 | 790 | 40 | 11 | 710 | 80 | 593 | 100 | 62.98 |
| Ex.16 | 610 | 60 | 150 | 630 | 80 | 820 | 30 | 9 | 730 | 100 | 585 | 150 | 51.66 |
| Ex.17 | 580 | 65 | 300 | 640 | 50 | 845 | 10 | 6 | 770 | 150 | 590 | 300 | 31.60 |
| Traditional process 1 | 650 | 79 | 11 | 150 | 8 | 750 | 160 | 10 | 675 | 150 | 585 | 30 | 273.75 |
| Traditional process 2 | 630 | 76 | 10 | 150 | 7 | 770 | 130 | 9 | 675 | 80 | 600 | 60 | 252.69 |
| Traditional process 3 | 620 | 70 | 11 | 180 | 6 | 790 | 110 | 10 | 675 | 75 | 590 | 90 | 245.16 |

TABLE 8-continued

|  | | Rapid heat treatment (two-stage) | | | | | | | | | | total time of rapid heat treatment and hot-dipping aluminum-zinc or hot-dipping zinc-aluminum-magnesiums |
|---|---|---|---|---|---|---|---|---|---|---|---|---|
|  | | Rapid heating (two-stage) | | | | | Slow cooling | | | | |  |
|  | | | Temper-ature after heating in the first stage ° C. | Heating rate in the second stage ° C./s | Soaking | | | End temper-ature of slow cooling ° C. | | Hot | |  |
|  | Cold rolling reduction rate % | Heating rate in the first stage ° C./s | | | Soaking temper-ature ° C. | Soaking times | Slow cooling rate ° C./s | | Rapid cooling rate ° C./s | dipping temper-ature ° C. | Final cooling rate ° C./s |  |
|  | Coiling temper-ature ° C. | | | | | | | | | | |  |
| Traditional process 4 | 610 | 65 | 13 | 210 | 5 | 820 | 90 | 8 | 675 | 60 | 580 | 120 | 250.84 |
| Traditional process 5 | 580 | 60 | 15 | 250 | 5 | 845 | 70 | 12 | 675 | 50 | 585 | 150 | 224.05 |
| Traditional process 6 | 650 | 79 | 11 | 150 | 8 | 750 | 160 | 10 | 675 | 150 | 585 | 50 | 266.22 |
| Traditional process 7 | 630 | 76 | 10 | 150 | 7 | 770 | 130 | 9 | 675 | 100 | 590 | 100 | 248.68 |
| Traditional process 8 | 620 | 70 | 11 | 180 | 6 | 790 | 110 | 10 | 675 | 80 | 597 | 150 | 242.57 |
| Traditional process 9 | 610 | 65 | 13 | 210 | 5 | 820 | 90 | 8 | 675 | 60 | 598 | 300 | 248.19 |
| Traditional process 10 | 580 | 60 | 15 | 250 | 5 | 845 | 70 | 12 | 675 | 50 | 586 | 180 | 223.44 |

TABLE 9

| No | test steel | Main process parameters (Rapid heating-two stage) | Yield strength (MPa) | Tensile strength (MPa) | Elongation (%) | Product of strength and elongation (MPa %) | $n_{90}$ value |
|---|---|---|---|---|---|---|---|
| 1 | A | Traditional process 1 | 382 | 684 | 23 | 15732 | 0.164 |
| 2 | A | Ex.1 | 501 | 813 | 23.4 | 19024.2 | 0.227 |
| 3 | B | Traditional process 2 | 385 | 640 | 24.1 | 15424 | 0.155 |
| 4 | B | Ex.2 | 503 | 812 | 23.8 | 19325.6 | 0.218 |
| 5 | C | Traditional process 3 | 379 | 656 | 23.6 | 15481.6 | 0.165 |
| 6 | C | Ex.3 | 500 | 818 | 23.5 | 19223 | 0.21 |
| 7 | D | Traditional process 4 | 384 | 649 | 23.9 | 15511.1 | 0.163 |
| 8 | D | Ex.4 | 514 | 815 | 24.8 | 20212 | 0.214 |
| 9 | E | Traditional process 5 | 386 | 643 | 24.9 | 16010.7 | 0.168 |
| 10 | E | Ex.5 | 510 | 812 | 23.6 | 19163.2 | 0.215 |
| 11 | O | Ex.6 | 548 | 846 | 23.7 | 20050.2 | 0.231 |
| 12 | O | Traditional process 4 | 392 | 699 | 21.9 | 15308.1 | 0.168 |
| 13 | L | Ex.7 | 535 | 852 | 22.6 | 19255.2 | 0.236 |
| 14 | L | Traditional process 3 | 395 | 669 | 22.2 | 14851.8 | 0.169 |
| 15 | H | Ex.4 | 538 | 848 | 21.2 | 17977.6 | 0.229 |
| 16 | H | Traditional process 4 | 386 | 695 | 21.5 | 14942.5 | 0.1642 |
| 17 | Q | Ex.2 | 501 | 823 | 23 | 18929 | 0.238 |
| 18 | Q | Traditional process 2 | 375 | 704 | 22.4 | 15769.6 | 0.169 |
| 19 | I | Ex.3 | 512 | 826 | 23.2 | 19163.2 | 0.215 |
| 20 | J | Ex.4 | 523 | 835 | 22.5 | 18787.5 | 0.228 |
| 21 | N | Ex.5 | 512 | 838 | 23.8 | 19944.4 | 0.213 |
| 22 | F | Ex.6 | 509 | 807 | 24.7 | 19932.9 | 0.215 |
| 23 | K | Ex.7 | 521 | 823 | 22.4 | 18435.2 | 0.211 |
| 24 | R | Ex.8 | 538 | 824 | 23 | 18952 | 0.216 |
| 25 | G | Ex.9 | 553 | 828 | 23.5 | 19458 | 0.225 |
| 26 | P | Ex.10 | 551 | 829 | 22.3 | 18486.7 | 0.216 |
| 27 | S | Ex.11 | 546 | 817 | 23 | 18791 | 0.215 |
| 28 | M | Ex.12 | 556 | 823 | 22.7 | 18682.1 | 0.235 |

| No | test steel | Main process parameters (Rapid heating-two stage) | Yield strength (MPa) | Tensile strength (MPa) | Elongation (%) | Product of strength and elongation (MPa %) | $n_{90}$ value |
|---|---|---|---|---|---|---|---|
| 1 | A | Traditional process 6 | 340 | 625 | 24.5 | 15312.5 | 0.163 |
| 2 | A | Ex.13 | 476 | 786 | 23.6 | 18549.6 | 0.213 |
| 3 | B | Traditional process 7 | 345 | 639 | 24 | 15336 | 0.169 |
| 4 | B | Ex.14 | 482 | 818 | 22.7 | 18568.6 | 0.215 |
| 5 | C | Traditional process 8 | 350 | 635 | 25 | 15875 | 0.155 |
| 6 | C | Ex.15 | 490 | 810 | 22.4 | 18144 | 0.218 |
| 7 | D | Traditional process 9 | 356 | 630 | 26.6 | 16758 | 0.169 |
| 8 | D | Ex.16 | 495 | 812 | 22.3 | 18107.6 | 0.215 |
| 9 | E | Traditional process 10 | 360 | 670 | 24.1 | 16147 | 0.164 |
| 10 | E | Ex.17 | 497 | 798 | 24.7 | 19710.6 | 0.228 |
| 11 | O | Traditional process 7 | 361 | 638 | 24.2 | 15439.6 | 0.165 |
| 12 | O | Ex.14 | 495 | 810 | 23.5 | 19035 | 0.235 |
| 13 | L | Traditional process 8 | 360 | 646 | 23.5 | 15181 | 0.162 |
| 14 | L | Ex.15 | 500 | 803 | 23.6 | 18950.8 | 0.235 |
| 15 | H | Traditional process 9 | 365 | 664 | 24.4 | 16201.6 | 0.165 |
| 16 | H | Ex.16 | 492 | 805 | 23.3 | 18756.5 | 0.238 |
| 17 | Q | Traditional process 10 | 363 | 642 | 25.3 | 16242.6 | 0.161 |
| 18 | Q | Ex.17 | 535 | 823 | 20.5 | 16871.5 | 0.238 |
| 19 | I | Ex.13 | 532 | 816 | 23.3 | 19012.8 | 0.239 |
| 20 | J | Ex.14 | 526 | 814 | 23.5 | 19129 | 0.223 |
| 21 | N | Ex.15 | 535 | 818 | 22.6 | 18486.8 | 0.2325 |
| 22 | F | Ex.16 | 548 | 829 | 20.1 | 16662.9 | 0.228 |
| 23 | K | Ex.17 | 508 | 811 | 20.8 | 16868.8 | 0.232 |
| 24 | R | Ex.16 | 536 | 815 | 22.6 | 18419 | 0.235 |
| 25 | G | Ex.15 | 515 | 806 | 23.2 | 18699.2 | 0.234 |
| 26 | P | Ex.14 | 506 | 800 | 23.6 | 18880 | 0.235 |
| 27 | S | Ex.13 | 509 | 796 | 24.8 | 19740.8 | 0.237 |
| 28 | M | Ex.17 | 528 | 815 | 22.5 | 18337.5 | 0.234 |

The microstructure of dual phase steel treated by the process according to the present disclosure is characterized in that ferrite, martensitic grain structure and carbide are very fine and evenly distributed in the matrix, which is very beneficial to the improvement of the strength and plasticity of the material. Therefore, the manufacturing process of the dual phase steel according to the present disclosure can refine grains, evenly distribute each phase structure of material in matrix, thereby improving material structure and performance.

The present disclosure modifies the traditional continuous annealing unit by using rapid heating and rapid cooling process to realize the rapid heat treatment process, which can greatly shorten the length of the heating section and soaking section of the traditional continuous annealing furnace, improve the production efficiency of the traditional continuous annealing unit, reduce production costs and energy consumption, and reduce the number of rollers in the continuous annealing furnace. This can improve the quality control ability of strip steel surface to obtain strip steel products with high surface quality. At the same time, through the establishment of a new continuous annealing unit using the rapid heat treatment process technology, it can provide short and compact unit, flexible product specifications and varieties, and strong regulation ability. For materials, strip steel grains can be refined to further improve material strength, reduce alloy cost and manufacturing difficulty in the process before-heat treatment, and improve the use performance of materials such as forming and welding.

In summary, the present disclosure has greatly promoted the technological progress of continuous annealing process of cold-rolled strip steel by adopting the rapid heat treatment process. The austenitization of cold-rolled strip steel from room temperature to the final completion can be expected to be completed in more than ten seconds or even a few seconds, which greatly shortens the length of the heating section of the continuous annealing furnace. It is convenient to improve the speed and production efficiency of the continuous annealing unit, and significantly reduces the number of rolls in the furnace of the continuous annealing unit. For the rapid heat treatment production line with a unit speed of about 180 m/min, the number of rollers in the high-temperature furnace section does not exceed 10, which can significantly improve the quality of the strip steel surface. At the same time, the rapid heat treatment process can complete the recrystallization and austenitization in a very short time. It will also provide a more flexible microstructure design method of high-strength steel, so as to improve the material structure and the material properties without changing the alloy composition and pre-process conditions such as rolling process.

Advanced high-strength steel with high corrosion-resistant coating represented by dual-phase steel has broad application prospects. The rapid heat treatment technology has great development value. Their combination will surely provide more space for the development and production of dual-phase steel.

What is claimed is:

1. A hot-dip aluminum-zinc or hot-dip zinc-aluminum-magnesium dual-phase steel with high formability comprises the following chemical components in mass percentages: C: 0.045~0.12%, Si: 0.1~0.5%, Mn: 1.0~2.0%, P≤0.02%, S≤0.006%, Al: 0.02~0.055%, optionally one or two of Cr, Mo, Ti, Nb, V, and Cr+Mo+Ti+Nb+V≤0.5%, with a balance of Fe and other unavoidable impurities;

wherein the hot-dip aluminum-zinc or hot-dip zinc-aluminum-magnesium dual-phase steel with high formability has a yield strength of ≥300 MPa, a tensile strength of 630~860 MPa, an elongation of ≥20%, a product of tensile strength and elongation of ≥15 GPa % and a strain hardening index $n_{90}$ value greater than 0.20; and wherein the hot-dip aluminum-zinc or hot-dip zinc-aluminum-magnesium dual-phase steel with high formability has a metallographic structure which is an uniformly distributed ferritic and martensitic dual-phase structure having an average grain size of 1~5 μm.

2. The hot-dip aluminum-zinc or hot-dip zinc-aluminum-magnesium dual-phase steel with high formability according to claim 1,
wherein the C content is 0.045~0.105%, 0.05~0.12%, 0.065~0.085% or 0.07~0.10%; and/or
wherein the Si content is 0.15~0.25% or 0.1~0.4%; and/or
wherein the Mn content is 1.0%~1.5%, 1.2%~2.0%, 1.2%~1.35% or 1.5~1.8%; and/or
wherein Cr+Mo+Ti+Nb+V≤0.4%, or ≤0.2%.

3. The hot-dip aluminum-zinc or hot-dip zinc-aluminum-magnesium dual-phase steel with high formability according to claim 1, wherein the hot-dip aluminum-zinc or hot-dip zinc-aluminum-magnesium dual-phase steel with high formability has a yield strength of 300~560 MPa, 300~400 MPa or 450~560 MPa, a tensile an elongation of 20~30%, and a product of tensile strength and elongation of 15~21 GPa %.

4. The hot-dip aluminum-zinc or hot-dip zinc-aluminum-magnesium dual-phase steel with high formability according to claim 1, wherein the hot-dip aluminum-zinc or hot-dip zinc-aluminum-magnesium dual-phase steel with high formability comprises the following chemical components in mass percentages: C: 0.045~0.105%, Si: 0.1~0.4%, Mn: 1.0~1.5%, P≤0.02%, S≤0.006%, Al: 0.02~0.055%, optionally one or two of Cr, Mo, Ti, Nb, V, and Cr+Mo+Ti+Nb+V≤0.3%, with a balance of Fe and other unavoidable impurities.

5. The hot-dip aluminum-zinc or hot-dip zinc-aluminum-magnesium dual-phase steel with high formability according to claim 4, wherein:
the hot-dip aluminum-zinc or hot-dip zinc-aluminum-magnesium dual-phase steel with high formability has a yield strength of 300-400 MPa, a tensile strength of 630~700 MPa, an elongation of 22~30%, a product of tensile strength and elongation of 15~20 GPa % and a strain hardening index $n_{90}$ value greater than 0.21;
or the hot-dip aluminum-zinc or hot-dip zinc-aluminum-magnesium dual-phase steel with high formability has a yield strength of 304~398 MPa, a tensile strength of 630~698 MPa, an elongation of 22.3~29.4%, a product of tensile strength and elongation of 15.3~19.4 GPa % and a strain hardening index $n_{90}$ value greater than 0.21.

6. The hot-dip aluminum-zinc or hot-dip zinc-aluminum-magnesium dual-phase steel with high formability according to claim 4, wherein the dual-phase steel is obtained by the following process:
a) Smelting, casting
wherein the chemical components are subjected to smelting and casting to form a slab;
b) Hot rolling, coiling
wherein a coiling temperature is 550~680° C.;
c) Cold rolling
wherein a cold rolling reduction rate is 40~85%;
d) Rapid heat treatment, hot-dipping aluminum-zinc or hot-dipping zinc-aluminum-magnesium
wherein a steel plate after cold rolling is rapidly heated to 750~845° C., wherein the rapid heating is performed in one stage or two stages;
when the rapid heating is performed in one stage, a heating rate is 50~500° C./s;
when the rapid heating is performed in two stages, the steel plate is heated in the first stage from room temperature to 550~650° C. at a heating rate of 15~500° C./s, and heated in the second stage from 550~650° C. to 750~845° C. at a heating rate of 50~500° C./s;
then soaked at a soaking temperature of 750~845° C. for a soaking time of 10~60 s; wherein after soaking, the steel plate is slowly cooled to 670~770° C. at a cooling rate of 5~15° C./s, then rapidly cooled to 580~600° C. at a cooling rate of 50~150° C./s, and immersed in a zinc pot for hot-dipping aluminum-zinc or hot-dipping zinc-aluminum-magnesium;
after hot-dipping aluminum-zinc, the steel plate is rapidly cooled to room temperature at a cooling rate of 30~200° C./s to obtain a hot-dip aluminum-zinc AZ product; or
after hot-dipping zinc-aluminum-magnesium, the steel plate is rapidly cooled to room temperature at a cooling rate of 30~180° C./s to obtain a hot-dip zinc-aluminum-magnesium AM product.

7. The hot-dip aluminum-zinc or hot-dip zinc-aluminum-magnesium dual-phase steel with high formability according to claim 6, wherein
a total time of performing step d) is 29~122 s; and/or
in step b), a hot rolling finishing temperature is ≥Ar$_3$; and/or
in step b), the coiling temperature is 580~650° C.; and/or
in step c), the cold rolling reduction rate is 60~80%; and/or
in step d), when the rapid heating is performed in one stage, the heating rate is 50~300° C./s; and/or
in step d), the rapid heating is performed in two stages, wherein the steel plate is heated in the first stage from room temperature to 550~650° C. at a heating rate of 15~300° C./s, and heated in the second stage from 550~650° C. to 750~845° C. at a heating rate of 50~300° C./s; or in step d), the rapid heating is performed in two stages, wherein the steel plate is heated in the first stage from room temperature to 550~650° C. at a heating rate of 30~300° C./s, and heated in the second stage from 550~650° C. to 750~845° C. at a heating rate of 80~300° C./s.

8. The hot-dip aluminum-zinc or hot-dip zinc-aluminum-magnesium dual-phase steel with high formability according to claim 1, wherein the hot-dip aluminum-zinc or hot-dip zinc-aluminum-magnesium dual-phase steel with high formability comprises the following chemical components in mass percentages: C: 0.05~0.12%, Si: 0.1~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities.

9. The hot-dip aluminum-zinc or hot-dip zinc-aluminum-magnesium dual-phase steel with high formability according to claim 8, wherein the hot-dip aluminum-zinc or hot-dip zinc-aluminum-magnesium dual-phase steel with high formability is obtained by the following process:
A) Smelting, casting
wherein the above components are subjected to smelting and casting to form a slab;
B) Hot rolling, coiling
wherein a coiling temperature is 550~680° C.;
C) Cold rolling
wherein a cold rolling reduction rate is 40~85%;
D) Rapid heat treatment, hot-dipping aluminum-zinc or hot-dipping zinc-aluminum-magnesium
Wherein a steel plate after cold rolling is rapidly heated to 750~845° C., wherein the rapid heating is performed in one stage or two stages;

when the rapid heating is performed in one stage, a heating rate is 50~500° C./s;

when the rapid heating is performed in two stages, the steel plate is heated in the first stage from room temperature to 550~650° C. at a heating rate of 15~500° C./s, and heated in the second stage from 550~650° C. to 750~845° C. at a heating rate of 50~500° C./s;

then soaked at a soaking temperature of 750~845° C. for a soaking time of 10~60 s;

wherein after soaking, the steel plate is slowly cooled to 670~770° C. at a cooling rate of 5~15° C./s, then rapidly cooled to 580~600° C. at a cooling rate of 50~150° C./s, and immersed in a zinc pot for hot-dipping aluminum-zinc or hot-dipping zinc-aluminum-magnesium;

after hot-dipping aluminum-zinc, the steel plate is rapidly cooled to room temperature at a cooling rate of 30~150° C./s to obtain a hot-dip aluminum-zinc AZ product; or after hot-dipping zinc-aluminum-magnesium, the steel plate is rapidly cooled to room temperature at a cooling rate of 10~300° C./s to obtain a hot-dip zinc-aluminum-magnesium AM product; or a total time of performing step D) is 29~159 s.

10. The hot-dip aluminum-zinc or hot-dip zinc-aluminum-magnesium dual-phase steel with high formability according to claim 9, wherein in step B), a hot rolling finishing temperature is ≥$Ar_3$; and/or in step B), the coiling temperature is 580~650° C.; and/or in step C), the cold rolling reduction rate is 60~80%; and/or in step D), when the rapid heating is performed in one stage, the heating rate is 50~300° C./s; and/or in step D), the rapid heating is performed in two stages, wherein the steel plate is heated in the first stage from room temperature to 550~650° C. at a heating rate of 15~300° C./s, and heated in the second stage from 550~650° C. to 750~845° C. at a heating rate of 50~300° C./s; or the steel plate is heated in the first stage from room temperature to 550~650° C. at a heating rate of 30~300° C./s, and heated in the second stage from 550~650° C. to 750~845° C. at a heating rate of 80~300° C./s; and/or in step D), after hot-dipping zinc-aluminum-magnesium, the steel plate is rapidly cooled to room temperature at a cooling rate of 30~250° C./s to obtain a hot-dip zinc-aluminum-magnesium AM product.

11. A manufacturing process of the hot-dip aluminum-zinc or hot-dip zinc-aluminum-magnesium dual-phase steel with high formability according to claim 1, which comprises the following steps:

1) Smelting, casting wherein the above components are subjected to smelting and casting to form a slab;

2) Hot rolling, coiling wherein a coiling temperature is 550~680° C.;

3) Cold rolling wherein a cold rolling reduction rate is 40~85%, thereby obtaining a rolled hard strip steel or steel plate;

4) Rapid heat treatment, hot-dipping aluminum-zinc or hot-dipping zinc-aluminum-magnesium A) Rapid heating wherein the strip steel or steel plate after cold rolling is rapidly heated to 750~845° C., which is a target temperature of the dual phase region of austenite and ferrite; wherein the rapid heating is performed in one stage or two stages;

when the rapid heating is performed in one stage, a heating rate is 15~500° C./s or 50~500° C./s;

when the rapid heating is performed in two stages, the strip steel or steel plate is heated in the first stage from room temperature to 550~650° C. at a heating rate of 15~500° C./s, and heated in the second stage from 550~650° C. to 750~845° C. at a heating rate of 30~500° C./s or 50~500° C./s;

B) soaking wherein the strip steel or steel plate is soaked at a soaking temperature of 750~845° C., which is the target temperature of the dual phase region of austenite and ferrite, for a soaking time of 10~60 s;

C) Cooling wherein after soaking, the strip steel or steel plate is slowly cooled to 670~770° C. at a cooling rate of 5~15° C./s, then rapidly cooled to 580~600° C. at a cooling rate of 50~200° C./s or 50~150° C./s;

D) hot-dipping aluminum-zinc or hot-dipping zinc-aluminum-magnesium wherein, after the strip steel or steel plate is rapidly cooled to 580~600° C., it is immersed in a zinc pot for hot-dipping aluminum-zinc or hot-dipping zinc-aluminum-magnesium;

E) after immersing in a zinc pot for hot-dipping aluminum-zinc, the steel plate is rapidly cooled to room temperature at a cooling rate of 30~200° C./s or 30~150° C./s to obtain a hot-dip aluminum-zinc AZ product; or after immersing in a zinc pot for hot-dipping zinc-aluminum-magnesium, the steel plate is rapidly cooled to room temperature at a cooling rate of 10~300° C./s or 30~180° C./s to obtain a hot-dip zinc-aluminum-magnesium AM product.

12. The process of claim 11, wherein a total time of performing step 4) is 29~159 s or 29~122 s; and/or in step 2), a hot rolling finishing temperature is ≥$Ar_3$; and/or in step 2), the coiling temperature is 580~650° C.; and/or in step 3), the cold rolling reduction rate is 60~80%; and/or in step 4), when the rapid heating is performed in one stage, the heating rate is 50~300° C./s; and/or in step 4), the rapid heating is performed in two stages, wherein the strip steel or steel plate is heated in the first stage from room temperature to 550~650° C. at a heating rate of 15~300° C./s, and heated in the second stage from 550~650° C. to 750~845° C. at a heating rate of 50~300° C./s; or the strip steel or steel plate is heated in the first stage from room temperature to 550~650° C. at a heating rate of 30~300° C./s, and heated in the second stage from 550~650° C. to 750~845° C. at a heating rate of 80~300° C./s; and/or in step 4), the final temperature after rapid heating is 770~830° C.; and/or in the soaking process of step 4), after the strip steel or steel plate is heated to the target temperature of dual phase region of austenite and ferrite, the temperature is kept unchanged for soaking; and/or in the soaking process of step 4), the strip steel or steel plate is slightly heated up or cooled down in the soaking time, wherein the temperature after heating is no more than 845° C. and the temperature after cooling is no less than 750° C.; and/or the soaking time is 10~40 s.

13. The process of claim 11, wherein:
(1) the process is used to produce a hot-dip aluminum-zinc or hot-dip zinc-aluminum-magnesium dual-phase steel with high formability having a tensile strength of 630~860 MPa comprising the following chemical components in mass percentages: C: 0.045~0.105%, Si: 0.1~0.4%, Mn: 1.0~1.5%, P≤0.02%, S≤0.006%, Al: 0.02~0.055%, optionally one or two of Cr, Mo, Ti, Nb, V, and Cr+Mo+Ti+Nb+V≤0.3%, with a balance of Fe and other unavoidable impurities,
wherein:
after hot-dipping aluminum-zinc, the strip steel or steel plate is rapidly cooled to room temperature at a cooling rate of 30~200° C./s to obtain a hot-dip aluminum-zinc AZ product; or after hot-dipping zinc-aluminum-magnesium, the strip steel or steel plate is rapidly cooled to room temperature at a cooling rate of 30~180° C./s to obtain a hot-dip zinc-aluminum-magnesium AM product; or
(2) the process is used to produce a hot-dip aluminum-zinc or hot-dip zinc-aluminum-magnesium dual-phase steel with high formability having a tensile strength of 630~860 MPa comprising the following chemical components in mass percentages: C: 0.05~0.12%, Si: 0.1~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities; wherein after hot-dipping aluminum-zinc, the strip steel or steel plate is rapidly cooled to room temperature at a cooling rate of 30~150° C./s to obtain a hot-dip aluminum-zinc AZ product; or after hot-dipping zinc-aluminum-magnesium, the steel plate is rapidly cooled to room temperature at a cooling rate of 10~300° C./s to obtain a hot-dip zinc-aluminum-magnesium AM product.

14. The hot-dip aluminum-zinc or hot-dip zinc-aluminum-magnesium dual-phase steel with high formability according to claim 1, wherein the hot-dip aluminum-zinc or hot-dip zinc-aluminum-magnesium dual-phase steel with high formability is obtained by the following process:
1) Smelting, casting
wherein the above components are subjected to smelting and casting to form a slab;
2) Hot rolling, coiling
wherein a coiling temperature is 550~680° C.;
3) Cold rolling
wherein a cold rolling reduction rate is 40~85%;
4) Rapid heat treatment, hot-dipping aluminum-zinc or hot-dipping zinc-aluminum-magnesium
wherein a steel plate after cold rolling is rapidly heated to 750~845° C., wherein the rapid heating is performed in one stage or two stages;
when the rapid heating is performed in one stage, a heating rate is 15~500° C./s or 50~500° C./s;
when the rapid heating is performed in two stages, the steel plate is heated in the first stage from room temperature to 550~650° C. at a heating rate of 15~500° C./s, and heated in the second stage from 550~650° C. to 750~845° C. at a heating rate of 30~500° C./s or 50~500° C./s;

then soaked at a soaking temperature of 750~845° C. for a soaking time of 10~60 s;
wherein after soaking, the steel plate is slowly cooled to 670~770° C. at a cooling rate of 5~15° C./s, then rapidly cooled to 580~600° C. at a cooling rate of 50~200° C./s or 50~150° C./s, and immersed in a zinc pot for hot-dipping aluminum-zinc or hot-dipping zinc-aluminum-magnesium;
after hot-dipping aluminum-zinc, the steel plate is rapidly cooled to room temperature at a cooling rate of 30~200° C./s or 30~150° C./s to obtain a hot-dip aluminum-zinc AZ product; or
after hot-dipping zinc-aluminum-magnesium, the steel plate is rapidly cooled to room temperature at a cooling rate of 10~300° C./s or 30~180° C./s to obtain a hot-dip zinc-aluminum-magnesium AM product.

15. The hot-dip aluminum-zinc or hot-dip zinc-aluminum-magnesium dual-phase steel with high formability according to claim 4, wherein:
the hot-dip aluminum-zinc or hot-dip zinc-aluminum-magnesium dual-phase steel with high formability has a C content of 0.065~0.085%; and/or, the hot-dip aluminum-zinc or hot-dip zinc-aluminum-magnesium dual-phase steel with high formability has a Si content of 0.15~0.25%; and/or, the hot-dip aluminum-zinc or hot-dip zinc-aluminum-magnesium dual-phase steel with high formability has a Mn content of 1.2%~1.35%; and/or
in the hot-dip aluminum-zinc or hot-dip zinc-aluminum-magnesium dual-phase steel with high formability, Cr+Mo+Ti+Nb+V≤0.2%; and/or
the hot-dip aluminum-zinc or hot-dip zinc-aluminum-magnesium dual-phase steel with high formability has an average grain size of 1~3 μm.

16. The hot-dip aluminum-zinc or hot-dip zinc-aluminum-magnesium dual-phase steel with high formability according to claim 8, wherein:
the hot-dip aluminum-zinc or hot-dip zinc-aluminum-magnesium dual-phase steel with high formability has a C content of 0.07~0.10%; and/or, the hot-dip aluminum-zinc or hot-dip zinc-aluminum-magnesium dual-phase steel with high formability has a Si content of 0.1~0.4%; and/or, the hot-dip aluminum-zinc or hot-dip zinc-aluminum-magnesium dual-phase steel with high formability has a Mn content of 1.5~1.8%; and/or Cr+Mo+Ti+Nb+V≤0.4%; and
the hot-dip aluminum-zinc or hot-dip zinc-aluminum-magnesium dual-phase steel with high formability has a yield strength of 470~550 MPa, a tensile strength of 780~860 MPa, an elongation of 20~25%, a product of tensile strength and elongation of 16~21 GPa % and a strain hardening index $n_{90}$ value greater than 0.20; or, the hot-dip aluminum-zinc or hot-dip zinc-aluminum-magnesium dual phase steel with high formability has a yield strength of 476~556 MPa, a tensile strength of 786~852 MPa, an elongation of 20.1~24.8%, a product of tensile strength and elongation of 16.7~20.2 GPa % and a strain hardening index $n_{90}$ value greater than 0.20.

17. The process of claim 13, wherein:
in (1), a total time of performing step 4) is 29~122 s; or
in (2), a total time of performing step 4) is 29~159 s.

* * * * *